US012633572B2

(12) United States Patent
Masuda et al.

(10) Patent No.: US 12,633,572 B2
(45) Date of Patent: May 19, 2026

(54) ELECTROLYTIC SOLUTION AND ELECTROCHEMICAL DEVICE

(71) Applicant: MURATA MANUFACTURING CO., LTD., Kyoto (JP)

(72) Inventors: Yasuyuki Masuda, Kyoto (JP); Masatomo Tanaka, Kyoto (JP); Daisuke Mori, Kyoto (JP); Yuri Nakayama, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 568 days.

(21) Appl. No.: 18/123,109

(22) Filed: Mar. 17, 2023

(65) Prior Publication Data

US 2023/0231197 A1 Jul. 20, 2023

Related U.S. Application Data

(63) Continuation of application No. PCT/JP2021/031560, filed on Aug. 27, 2021.

(30) Foreign Application Priority Data

Aug. 27, 2021 (WO) .................. PCT/JP2021/031560

(51) Int. Cl.
*H01M 10/0568* (2010.01)
*H01M 10/0569* (2010.01)

(52) U.S. Cl.
CPC ... *H01M 10/0568* (2013.01); *H01M 10/0569* (2013.01); *H01M 2300/0028* (2013.01)

(58) Field of Classification Search
None
See application file for complete search history.

(56) References Cited

U.S. PATENT DOCUMENTS

2013/0252112 A1 9/2013 Doe et al.
2021/0111401 A1 4/2021 Sedlarikova et al.
2021/0159542 A1 5/2021 Matsumoto et al.

FOREIGN PATENT DOCUMENTS

CN 106848244 A 6/2017
CN 109244544 A 1/2019
(Continued)

OTHER PUBLICATIONS

International Search Report of corresponding PCT application PCT/JP2021/027134, dated Oct. 5, 2021.
(Continued)

*Primary Examiner* — Colin W. Slifka
(74) *Attorney, Agent, or Firm* — K&L Gates LLP

(57) ABSTRACT

An electrolytic solution is provided and includes an electrolytic solution for an electrochemical device including a magnesium electrode as a negative electrode and a positive electrode, the electrolytic solution containing:

a solvent; and a first magnesium salt having a disilazide structure represented by General Formula (1):

$$(R_3Si)_2N \qquad (1)$$

wherein R is an aliphatic hydrocarbon group having 1 or more and 10 or less carbon atoms, and each R may be the same as or different from each other, the electrolytic solution substantially comprising no halogen.

16 Claims, 11 Drawing Sheets

(56) References Cited

FOREIGN PATENT DOCUMENTS

| | | | | | |
|---|---|---|---|---|---|
| CN | 109449543 | A | | 3/2019 | |
| EP | 3557676 | A1 | * | 10/2019 | .............. H01M 4/66 |
| WO | 2020027340 | A1 | | 2/2020 | |

OTHER PUBLICATIONS

Ha, Se-Young et al.; "Magnesium(II) Bis(trifluoromethane sulfonyl) Imide-Based Electrolytes with Wide Electrochemical Windows for Rechargeable Magnesium Batteries"; ACS Applied Materials & Interfaces; 2014, 6 (6), 4063-4073. (10 pages.).
Li Yaqi et al. "Electrochemically-driven interphase conditioning of magnesium electrode for magnesium sulfur batteries"; Journal of Energy Chemistry; 2019. vol. 37. pp. 215-219, p. 216, left column, line 11 to p. 217. left column, line 27.
Gao, Tao et al.; "Enhancing the reversibility of Mg/S battery chemistry through Li+ mediation"; Journal of the American Chemical Society, 2015, vol. 137, pp. 12388-12393, p. 12389, left column, line 36 to p. 12390, right column, line 16.
Kang, Sung-Jin et al.; "Electrolyte additive enabling conditioning-free electrolytes for magnesium batteries"; Applied Materials & Interfaces, 2019, vol. 11, pp. 517-524, pp. 518-523.
Ford, Hunter O. et al.; "Cross-linked ionomer gel separators for polysulfide shuttle mitigation in magnesium-Sulfur batteries: elucidation of structure-property relationships"; Macromolecules, 2018, vol. 51, pp. 8629-8636, pp. 8633-8635.
Office Action issued for corresponding Chinese Patent Application No. 202180063715.X dated Oct. 24, 2025. (4 pages.).
Search Report issued for corresponding Chinese Patent Application No. 202180063715.X, dated Oct. 22, 2025. (3 pages.).
Japanese Office Action issued Feb. 27, 2024 in corresponding Japanese Application No. 2022-550437.
Office Action issued in related Chinese Patent Application No. 202180063715.X, mailed on Apr. 16, 2026. 4 pages.
Search Report issued in related Chinese Patent Application No. 202180063715.X, mailed on Apr. 16, 2026. 2 pages.

* cited by examiner

ELECTROLYTIC SOLUTION AND ELECTROCHEMICAL DEVICE

CROSS REFERENCE RELATED APPLICATIONS

The present application is a continuation of PCT patent application no. PCT/JP2021/031560, filed on Aug. 27, 2021, which claims priority to Japanese patent application no. JP2020-157896, filed on Sep. 18, 2020, the entire contents of which are incorporate herein by reference.

BACKGROUND

The present application relates to an electrolytic solution and an electrochemical device.

Electrochemical devices include capacitors, air batteries, fuel cells, secondary batteries, and the like, and are used for various purposes. Such an electrochemical device includes a positive electrode and a negative electrode, and contains an electrolytic solution responsible for ion transport between the positive electrode and the negative electrode.

For example, an electrochemical device represented by a magnesium battery includes, as an electrode, an electrode made from magnesium or an electrode containing at least magnesium (hereinafter, such an electrode is also simply referred to as a "magnesium electrode", and the electrochemical device including the magnesium electrode is also referred to as a "magnesium electrode-based electrochemical device"). Magnesium is a more abundant resource and cheaper than lithium.

In addition, magnesium generally has a large amount of electricity per unit volume that can be extracted by a redox reaction, and is highly safe when used in an electrochemical device. Therefore, the magnesium battery draws attention as a next-generation secondary battery replacing lithium-ion batteries.

SUMMARY

The present application relates to an electrolytic solution and an electrochemical device.

Improvement in energy density is an important issue in magnesium batteries in which magnesium is used for a negative electrode.

This is considered to be because the overvoltage at the time of Mg dissolution and precipitation is large and the improvement in energy density is hindered. In this regard, although it is conceivable to deal with this issue depending on the type of Mg electrolytic solution, the positive electrode material, and the like, the current situation is that improvement for improving the energy density is still desired.

Halogen-free electrolytic solution is also an important issue. In the magnesium battery, the overvoltage at the time of dissolution and precipitation tends to increase, or dissolution and precipitation tend to be difficult. This is considered to be because a relatively strong oxide film is formed on the electrode surface of the magnesium battery. For example, in Patent Document 1, the electrolytic solution contains magnesium chloride $MgCl_2$ as an electrolyte. By using an electrolytic solution containing halogen (more specifically, chloride ions $Cl^-$ and $MgCl_2$), the oxide film is efficiently removed due to the corrosiveness of halogen, and the overvoltage is reduced.

On the other hand, the electrolytic solution containing halogen corrodes a portion formed by a metal (for example, an electrode or the like) in the magnesium battery due to the corrosiveness caused by halogen. From these reasons, it is not possible to sufficiently achieve both smooth progress of precipitation and dissolution, reduction of overvoltage, and suppression of corrosion. In this regard, although it is conceivable to deal with this issue depending on the type of Mg electrolytic solution, the current situation is that improvement for halogen-free is still desired. For example, a cluster type electrolyte having boron as a skeleton has been developed, but the problem arises in that the synthesis is complicated and the cost is relatively high. Therefore, development of a halogen-free electrolytic solution with a simpler composition is desired.

The present application relates to providing, in an embodiment, a halogen-free electrolytic solution that reduces the overvoltage at the time of Mg precipitation and dissolution and contributes to realization of an electric device having a higher energy density than before.

The present application, in an embodiment, provides an electrolytic solution for an electrochemical device including a magnesium electrode as a negative electrode and a positive electrode.

The electrolytic solution containing:

a solvent; and a first magnesium salt having a disilazide structure represented by General Formula (1):

[Chemical Formula 1]

$$(R_3Si)_2N \qquad (1)$$

wherein R is an aliphatic hydrocarbon group having 1 or more and 10 or less carbon atoms, and six R's may be the same as or different from each other, the electrolytic solution substantially containing no halogen.

In the electrolytic solution of the present application, the overvoltage at the time of Mg precipitation and dissolution is reduced, and an electric device having a higher energy density than before is provided. That is, in the magnesium electrode-based electrochemical device using the electrolytic solution of the present application, the overvoltage is reduced and the energy density becomes higher due to such a combination in which the electrolytic solution contains a first magnesium salt having a disilazide structure and substantially contains no halogen.

The effects described in the present specification are merely examples and are not limited, and may have additional effects.

DETAILED DESCRIPTION

Figure 1:
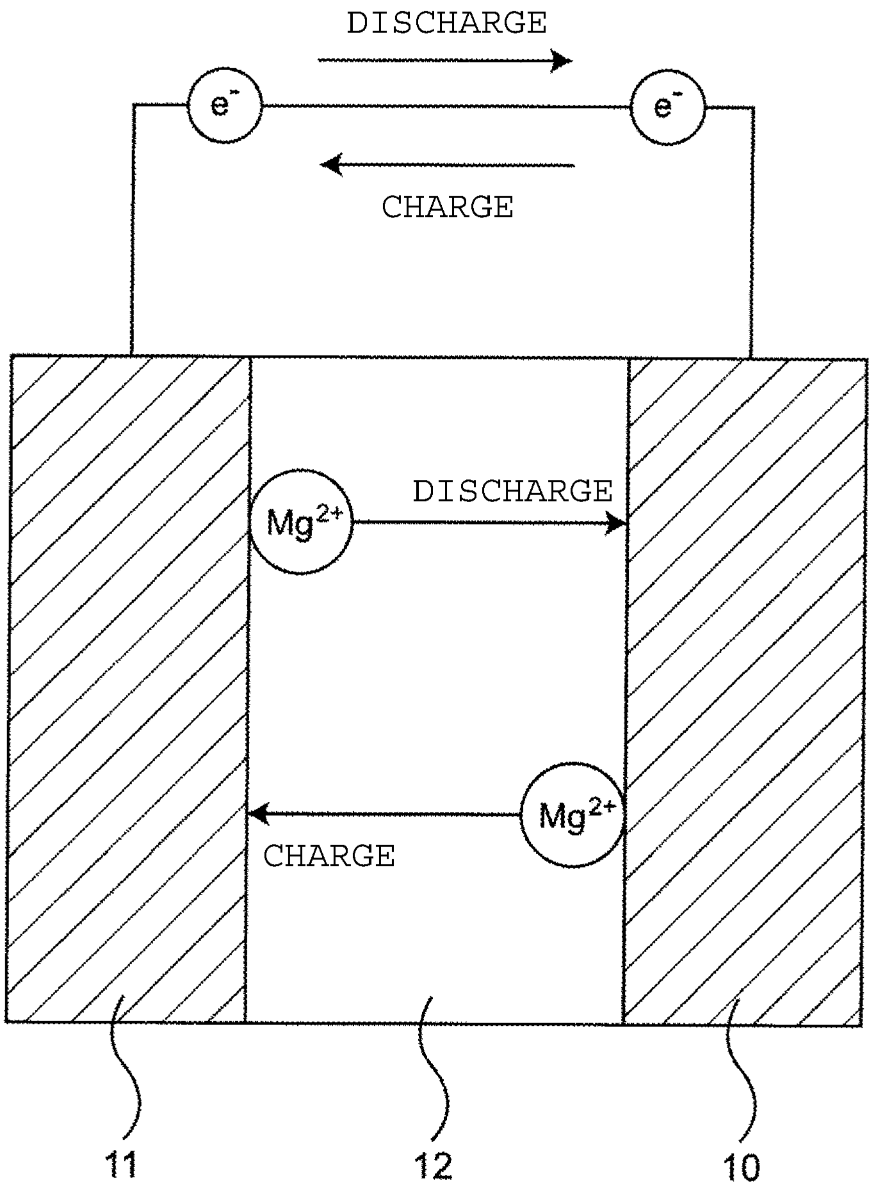
FIG. 1 is a conceptual diagram of a magnesium electrode-based electrochemical device (particularly a battery) according to an embodiment of the present application.

Hereinafter, an "electrolytic solution for an electrochemical device" and an "electrochemical device" according to an embodiment of the present application will be described in further detail. While the description is made with reference to the drawings as necessary, the contents shown in the drawings are only schematically and illustratively shown for understanding the present application, and the appearance, the dimensional ratio, and the like can be different from the actual ones. The various numerical ranges referred to herein are intended to include the lower and upper numerical values (namely, the upper limit value and the lower limit value) themselves, unless otherwise stated, such as "less than", "greater than", and "smaller than". That is, when there is, for example, a numerical range of 1 to 10, the lower limit value "1" and the upper limit value "10" are interpreted to be included unless otherwise specified.

In the present specification, the term "electrochemical device" means, in a broad sense, a device capable of extracting energy by utilizing electrochemical reactions. The "electrochemical device" narrowly means a device including a pair of electrodes and an electrolyte, particularly a device that charges and discharges along with movement of ions. Examples of the electrochemical device include a capacitor, an air battery, and a fuel cell as well as a secondary battery, which are merely examples.

An electrolytic solution according to an embodiment is used for an electrochemical device. That is, the electrolytic solution described in the present specification corresponds to an electrolyte for a device capable of extracting energy by utilizing an electrochemical reaction.

The electrolytic solution according to an embodiment is an electrolytic solution presupposed to be used in an electrochemical device including a magnesium electrode as a negative electrode and a positive electrode. Particularly, the electrolytic solution according to an embodiment is an electrolytic solution for an electrochemical device including a magnesium electrode as a negative electrode. Therefore, the electrolytic solution according to an embodiment can be said to be an electrolytic solution for a magnesium electrode-based electrochemical device (hereinafter, also simply referred to as a "magnesium electrode-based electrolytic solution").

As will be described later, preferably, the negative electrode of such an electrochemical device is a magnesium electrode, while the positive electrode is a sulfur electrode. That is, in a preferred embodiment, the electrolytic solution according to an embodiment is an electrolytic solution for a magnesium (Mg)-sulfur (S) electrode.

Here, the term "magnesium electrode" used in the present specification broadly refers to an electrode having magnesium (Mg) as an active ingredient (that is, an active material). In a narrow sense, the term "magnesium electrode" refers to an electrode containing magnesium, for example, an electrode containing a magnesium metal or a magnesium alloy, particularly a negative electrode of such magnesium. Such a magnesium electrode may contain a component other than the metal magnesium or the magnesium alloy, but is an electrode formed of a magnesium metal object (for example, an electrode formed of a solid object of metal magnesium having a purity of 90% or more, preferably a purity of 95% or more, further preferably a purity of 98% or more) in a preferred embodiment.

The term "sulfur electrode" used in the present specification broadly refers to an electrode having sulfur (S) as an active ingredient (that is, an active material). In a narrow sense, the term "sulfur electrode" refers to an electrode that contains at least sulfur, for example, to an electrode that contains sulfur (S), such as $S_8$ and/or polymeric sulfur, and especially to a positive electrode of such sulfur. The sulfur electrode may contain components other than sulfur, and may contain, for example, a conductive auxiliary agent and a binder. Although it is merely an example, a sulfur content in the sulfur electrode may be 5% by mass or more and 95% by mass or less based on the entire electrode, and may be, for example, about 70% by mass or more and about 90% by mass or less (in an exemplary embodiment, the sulfur content in the sulfur electrode may be 5% by mass to 20% by mass or 5% by mass to 15% by mass, for example).

A magnesium-based electrolytic solution according to an embodiment substantially contains no halogen. In a broad sense, the expression "the electrolytic solution substantially contains no halogen" used in the present specification means that halogen is not intentionally contained in the electrolytic solution and is contained in a trace amount to such an extent that the effect of the present application is not inhibited. In the present specification, the expression "not intentionally contained" means that a trace amount of halogen is contained in the electrolytic solution, for example, as a result of being inevitably or accidentally mixed or as a result of decomposition of a compound having a halogen element. In a narrow sense, the expression "the electrolytic solution substantially contains no halogen" means that the content of halogen contained in the electrolytic solution is 100 ppm (ppm by mass) or less, preferably 40 ppm or less, and more preferably 10 ppm or less. The form of the "halogen" in the "content of halogen" is, for example, an anion (halide ion) and a salt constituting with a cation (more specifically, magnesium halide). When a plurality of halogen forms are present in the electrolytic solution, the content of halogen is the total content of the plurality of halogen forms. In the present specification, "substantially containing no halogen" is also referred to as "halogen-free".

The magnesium electrode-based electrolytic solution according to an contains at least a solvent and a first magnesium salt.

The first magnesium salt has a disilazide structure represented by General Formula (1):

[Chemical Formula 2]

$$(R_3Si)_2N \quad (1)$$

in General Formula (1), R is an aliphatic hydrocarbon group having 1 or more and 10 or less carbon atoms, and six R's may be the same as or different from each other.

When the electrolytic solution contains the first magnesium salt represented by General Formula (1), the overvoltage is reduced and the energy density is improved in the electrochemical device including such an electrolytic solution.

In a preferred embodiment, the hydrocarbon group in the disilazide structure of the first magnesium salt is a lower alkyl group, and thus is, for example, a lower alkyl group having 1 or more and 4 or less carbon atoms (more specifically, for example, a methyl group, an ethyl group, a n-propyl group, an isopropyl group, a sec-butyl group, and/or a tert-butyl group, or the like). That is, in the first magnesium salt having a disilazide structure represented by General Formula (1) above, R is an aliphatic hydrocarbon group and may be particularly an alkyl group having 1 or more and 4 or less carbon atoms. As described above, when R in General Formula (1) is a lower alkyl group having 1 or more and 4 or less carbon atoms, the overvoltage is further reduced and the energy density is further improved in the electrochemical device. R in the first magnesium salt having a disilazide structure represented by $(R_3Si)_2N$ may be, for example, a methyl group, an ethyl group, a n-propyl group, an isopropyl group, a sec-butyl group, and/or a tert-butyl group, or the like.

A suitable form of the first magnesium salt is one having a methyl group. That is, in General Formula (1), R is preferably a methyl group. For example, the first magnesium salt used in the electrolytic solution according to an embodiment is magnesium bis(hexamethyldisilazide), that is, $Mg(HMDS)_2$. With the use of such a first magnesium salt, the overvoltage is reduced in the electrochemical device and the improvement in energy density is easily exerted. Particularly, such magnesium bis(hexamethyldisilazide) is combined with a second magnesium salt described below, and thus, in the electrochemical device (particularly a magnesium battery, more preferably, a magnesium-sulfur battery), the overvoltage is reduced and the improvement in energy density is more easily exerted.

The concentration of the first magnesium salt in the electrolytic solution may be, for example, 0.03 to 1 M (moL/L).

The electrolytic solution preferably further contains a second magnesium salt. The second magnesium salt is represented by General Formula (2):

[Chemical Formula 3]

$$MgN(C_mF_{2m+1}SO_2)_2 \quad (2)$$

in General Formula (2), m is an integer of 1 or more and 10 or less.

The second magnesium salt is a magnesium salt of perfluoroalkylsulfonylimide (magnesium bis(perfluoroalkylsulfonyl)imide, as represented in General Formula (2). When the electrolytic solution contains the second magnesium salt in addition to the first magnesium salt, the overvoltage is further reduced and the energy density is further improved in the electrochemical device (particularly a magnesium battery, more preferably, a magnesium-sulfur battery).

In General Formula (2), m is an integer of 1 or more and 10 or less, preferably an integer of 1 or more and 4 or less, and more preferably 1. In General Formula (2), when m is an integer of 1 or more and 4 or less (particularly 1), the overvoltage is further reduced and the energy density is further improved in the electrochemical device (particularly a magnesium battery, more preferably, a magnesium-sulfur battery). That is, in General Formula (2), $C_mF_{2m+1}$ is a perfluoroalkyl group having 1 or more and 10 or less carbon atoms, preferably a perfluoroalkyl group having 1 or more and 4 or less carbon atoms, and more preferably a trifluoromethyl group. Examples of the perfluoroalkyl group having 1 or more and 10 or less carbon atoms include a trifluoromethyl group, a pentafluoroethyl group, a heptafluoropropyl group, and a nonafluorobutyl group. In General Formula (2), two of $C_mF_{m+1}$ may be the same as or different from each other.

The second magnesium salt has, as a preferred embodiment, a trifluoromethyl group (a perfluoroalkyl group in which m in General Formula (2) is 1). That is, the first magnesium salt used in the electrolytic solution according to an embodiment is magnesium bis(trifluoromethylsulfonyl) imide, that is, $Mg(TFSI)_2$. Such $Mg(TFSI)_2$, together with the first magnesium salt (particularly, magnesium bis(hexamethyldisilazide)), further reduces the overvoltage and further improves the energy density in the magnesium electrode-based electrochemical device.

When the electrolytic solution further contains the second magnesium salt, in a preferred embodiment, the molar ratio of the second magnesium salt to the first magnesium salt may be about the same (more specifically, 0.5 to 2) (in a specific example, they may be equimolar amount to each other (that is, molar ratio: 1). The molar ratio of "second magnesium salt to first magnesium salt" as used herein refers to a value corresponding to "$N_{second\ Mg\ salt}/N_{first\ Mg\ salt}$", where "$N_{first\ Mg\ salt}$" denotes the amount of substance of the first magnesium salt and "$N_{second\ Mg\ salt}$" denotes the amount of substance of the second magnesium salt. The inclusion of the second magnesium salt in the electrolytic solution (particularly, an electrolytic solution containing a linear ether solvent described below as the solvent) at such a molar ratio contributes to further reduction of overvoltage and further improvement of energy density in the magnesium electrode-based electrochemical device. The amounts are not particularly limited, but regarding the combination of $Mg(HMDS)_2$ and $Mg(TFSI)_2$ as an example, the molar ratio of $Mg(HMDS)_2$:$Mg(TFSI)_2$ may be about 1:0.5 to 2.0, for example, about 1:0.5 to 1.25.

The electrolytic solution according to an embodiment may further contain another magnesium salt as an electrolyte in addition to the first magnesium salt and the second magnesium salt. Such another magnesium salt is not configured in the form of halogen as in the halide ion described above, and may be, for example, at least one magnesium salt selected from the group consisting of magnesium nitrate ($Mg(NO_3)_2$), magnesium sulfate ($MgSO_4$), magnesium acetate ($Mg(CH_3COO)_2$), and magnesium tetraphenylborate ($Mg(B(C_6H_5)_4)_2$).

The solvent is preferably a linear ether among ether-based solvents. That is, preferably, an ether having a molecule in a linear structure forms the magnesium electrode-based electrolytic solution solvent, not a cyclic ether such as tetrahydrofuran. Simply speaking, the solvent in the magnesium electrode-based electrolytic solution according to an embodiment is preferably a linear ether solvent.

In the magnesium electrode-based electrolytic solution according to an embodiment, the linear ether as a solvent is preferably a linear ether represented by General Formula (3):

[Chemical Formula 4]

(3)

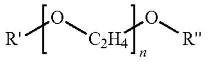

in General Formula (3), R' and R" are each independently a hydrocarbon group having 1 or more and 10 or less carbon atoms, and may be the same as or different from each other, and n is an integer of 1 or more and 10 or less.

As can be seen from General Formula (3), the solvent used in the magnesium electrode-based electrolytic solution according to an embodiment is preferably a linear ether having one or more ethyleneoxy structural units. The term "ethyleneoxy structural unit" here refers to a molecular structural unit ($—O—C_2H_4—$) in which an ethylene group and an oxygen atom are bonded, and one or more such molecular structural units are included in the electrolytic solution solvent.

R' and R" in General Formula (3) of the linear ether each independently represent a hydrocarbon group. Thus, R' and R" may each independently be an aliphatic hydrocarbon group, an aromatic hydrocarbon group and/or an aromatic-aliphatic hydrocarbon group. Here, the term "linear ether" in the present description means that at least the moiety of the ethyleneoxy structural unit is not branched (that is, does not have a branched structure). Therefore, R' and R" in General Formula (3) do not necessarily have to have a linear structure, and may have a branched structure. In a preferred embodiment, the linear ether to be used in the magnesium electrode-based electrolytic solution according to an embodiment is a glycol-based ether in which the moiety of the ethyleneoxy structural unit does not have a branched structure and R' and R" also have no branched structure.

Although it is only an example, specific examples of such a linear ether include ethylene glycol dimethyl ether (dimethoxyethane), diethylene glycol dimethyl ether, triethylene glycol dimethyl ether, tetraethylene glycol dimethyl ether, pentaethylene glycol dimethyl ether, and hexaethylene glycol dimethyl ether, and polyethylene glycol dimethyl ether.

In a preferred embodiment of the linear ether that may be contained in the magnesium electrode-based electrolytic solution according to an embodiment, the hydrocarbon group having 1 or more and 10 or less carbon atoms is an aliphatic hydrocarbon group. That is, in the linear ether that may be contained in the magnesium electrode-based electrolytic solution according to an embodiment, R' and R" in General Formula (3) may each independently be an aliphatic hydrocarbon group having 1 or more and 10 or less carbon atoms. Although not particularly limited, with regard to diethylene glycol-based ether (a linear ether in which n in General Formula (3) is 2), examples of linear ethers having an aliphatic hydrocarbon group having 1 or more and 8 or less carbon atoms as each of R' and R" include the following.

The linear ether in which R' and R" in General Formula (3) are an aliphatic hydrocarbon group having 1 or more and 8 or less carbon atoms is not particularly limited, and examples thereof include diethylene glycol dimethyl ether, diethylene glycol ethyl methyl ether, diethylene glycol methyl propyl ether, diethylene glycol butyl methyl ether, diethylene glycol methyl pentyl ether, diethylene glycol methyl hexyl ether, diethylene glycol methyl heptyl ether, and diethylene glycol methyl octyl ether;

diethylene glycol diethyl ether, diethylene glycol ethylpropyl ether, diethylene glycol butyl ethyl ether, diethylene glycol ethylpentyl ether, diethylene glycol ethylhexyl ether, diethylene glycol ethyl heptyl ether, and diethylene glycol ethyl octyl ether;

diethylene glycol dipropyl ether, diethylene glycol butyl propyl ether, diethylene glycol propylpentyl ether, diethylene glycol propyl hexyl ether, diethylene glycol propyl heptyl ether, and diethylene glycol propyl octyl ether;

diethylene glycol dibutyl ether, diethylene glycol butyl pentyl ether, diethylene glycol butyl hexyl ether, diethylene glycol butyl heptyl ether, and diethylene glycol butyl octyl ether; diethylene glycol dipentyl ether, diethylene glycol hexyl pentyl ether, diethylene glycol heptyl pentyl ether, and diethylene glycol octyl pentyl ether;

diethylene glycol dihexyl ether, diethylene glycol heptyl hexyl ether, and diethylene glycol hexyl octyl ether; diethylene glycol diheptyl ether and diethylene glycol heptyl octyl ether; and diethylene glycol dioctyl ether.

Among these linear ethers, a linear ether in which, in General Formula (3), R' and R" are each independently a lower alkyl group having 1 or more and 4 or less carbon atoms and n is an integer of 1 or more and 4 or less is more preferable, and a linear ether in which R' and R" are a methyl group and n is 2 (that is, diethylene glycol dimethyl ether) is particularly preferable. When the electrolytic solution according to an embodiment contains such a suitable linear ether as a solvent, in the electrochemical device, the overvoltage is further reduced, and the energy density is further improved.

In the magnesium electrode-based electrolytic solution according to an embodiment, preferably, the linear ether as described above coexists with the first magnesium salt represented by General Formula (1).

In a preferred embodiment of the magnesium electrode-based electrolytic solution according to an embodiment, the linear ether used as the solvent for the first magnesium salt and the second magnesium salt may be an ether having two ethyleneoxy structural units. That is, n in General Formula (3) may be 2, and thus the linear ether may be a diethylene glycol-based ether. In the linear ether, R' and R" in General Formula (3) may have the same alkyl group as each other. Examples of the linear ether include diethylene glycol dimethyl ether and/or diethylene glycol diethyl ether. In the case of such a linear ether, the second magnesium salt may be a magnesium salt of perfluoroalkylsulfonylimide (for example, $Mg(TFSI)_2$).

The magnesium electrode-based electrolytic solution according to an embodiment is suitable for the electrochemical device including a magnesium electrode as a negative electrode and is further suitable when the device includes a sulfur electrode as a positive electrode. That is, the electrolytic solution according to an embodiment is an electrolytic solution for the electrochemical device including a magnesium electrode as a negative electrode, and the electrochemical device preferably includes a sulfur electrode as a positive electrode. In the case of an electrochemical device including such a magnesium electrode-sulfur electrode pair (hereinafter, also referred to as “a magnesium-sulfur electrode-based electrochemical device”), the electrolytic solution according to an embodiment at least exerts the effect of improving the energy density in the magnesium-sulfur electrode-based electrochemical device. When the second magnesium salt (particularly, magnesium bis(trifluoromethylsulfonyl)imide) is combined with the first magnesium salt (particularly, bis(hexamethyldisilazide)), further improvement in energy density can be expected. Assuming a case where the electrochemical device is a secondary battery, this means that a magnesium-sulfur battery more preferably achieving the improvement of the energy density.

Next, the electrochemical device according to an embodiment will be described. Such an electrochemical device includes a negative electrode and a positive electrode, and a magnesium electrode is provided as the negative electrode. Such an electrochemical device is characterized by including an electrolytic solution formed of at least the electrolytic solution described above.

In the electrochemical device according to an embodiment, the magnesium electrode-based electrolytic solution contains at least a solvent and a first magnesium salt.

The first magnesium salt has a disilazide structure represented by General Formula (1):

[Chemical Formula 5]

$$(R_3Si)_2N \tag{1}$$

in General Formula (1), R is an aliphatic hydrocarbon group having 1 or more and 10 or less carbon atoms, and six R’s may be the same as or different from each other.

When the electrolytic solution contains the first magnesium salt represented by General Formula (1), the overvoltage is reduced and the energy density is improved in the electrochemical device including such an electrolytic solution.

In a preferred embodiment, the hydrocarbon group in the disilazide structure of the first magnesium is a lower alkyl group, and thus is, for example, a lower alkyl group having 1 or more and 4 or less carbon atoms (more specifically, for example, a methyl group, an ethyl group, a n-propyl group, an isopropyl group, a sec-butyl group, and/or a tert-butyl group, or the like). That is, in the first magnesium salt having a disilazide structure represented by General Formula (1), R is an aliphatic hydrocarbon group and may be particularly an alkyl group having 1 or more and 4 or less carbon atoms. As described above, when R in General Formula (1) is a lower alkyl group having 1 or more and 4 or less carbon atoms, the overvoltage is further reduced and the energy density is further improved in the electrochemical device. R in the first magnesium salt having a disilazide structure represented by $(R_3Si)_2N$ may be a methyl group, an ethyl group, a n-propyl group, an isopropyl group, a sec-butyl group, and/or a tert-butyl group, or the like.

A suitable form of the first magnesium salt is one having a methyl group. That is, in General Formula (1), R is preferably a methyl group. For example, in the electrochemical device according to an embodiment, the first magnesium salt used in the electrolytic solution is magnesium bis(hexamethyldisilazide), that is, $Mg(HMDS)_2$. With the use of such a first magnesium salt, in the electrochemical device, the overvoltage is reduced and the improvement in energy density is easily exerted.

Particularly, such magnesium bis(hexamethyldisilazide) is combined with a second magnesium salt described below, and thus, in the electrochemical device (particularly a magnesium battery, more preferably, a magnesium-sulfur battery), the overvoltage is reduced and the improvement in energy density is more easily exerted.

The concentration of the first magnesium salt in the electrolytic solution may be, for example, 0.03 to 1 M (moL/L).

The electrolytic solution preferably further contains a second magnesium salt. The second magnesium salt is represented by General Formula (2):

[Chemical Formula 6]

$$MgN(C_mF_{2m+1}SO_2)_2 \tag{2}$$

in General Formula (2), m is an integer of 1 or more and 10 or less.

The second magnesium salt is a magnesium salt of perfluoroalkylsulfonylimide (magnesium bis(perfluoroalkylsulfonyl)imide, as represented in General Formula (2). When the electrolytic solution contains the second magnesium salt in addition to the first magnesium salt, the overvoltage is further reduced and the energy density is further improved in the electrochemical device according to an embodiment (particularly a magnesium battery, more preferably, a magnesium-sulfur battery). In General Formula (2), two of $C_mF_{2m+1}$ may be the same as or different from each other.

In General Formula (2), m is an integer of 1 or more and 10 or less, preferably an integer of 1 or more and 4 or less, and more preferably 1. In General Formula (2), when m is an integer of 1 or more and 4 or less (particularly 1), the overvoltage is further reduced and the energy density is further improved in the electrochemical device according to an embodiment (particularly a magnesium battery, more preferably, a magnesium-sulfur battery). That is, in General Formula (2), $C_mF_{2m+1}$ is a perfluoroalkyl group having 1 or more and 10 or less carbon atoms, preferably a perfluoroalkyl group having 1 or more and 4 or less carbon atoms, and more preferably a trifluoromethyl group. Examples of the perfluoroalkyl group having 1 or more and 10 or less carbon atoms include a trifluoromethyl group, a pentafluoroethyl group, a heptafluoropropyl group, and a nonafluorobutyl group.

The second magnesium salt has, as a preferred embodiment, a trifluoromethyl group (a perfluoroalkyl group in which m in General Formula (2) is 1). That is, in the electrochemical device according to an embodiment, the first magnesium salt used in the electrolytic solution is preferably magnesium bis(trifluoromethylsulfonyl)imide, that is, $Mg(TFSI)_2$. Such $Mg(TFSI)_2$, together with the first magnesium salt (particularly, magnesium bis(hexamethyldisilazide)), further reduces the overvoltage and further improves the energy density in the electrochemical device according to an embodiment.

When the electrolytic solution further contains the second magnesium salt, in a preferred embodiment, the molar ratio of the second magnesium salt to the first magnesium salt may be about the same (more specifically, 0.5 to 2) (in a specific example, they may be equimolar amount to each other. The molar ratio of "second magnesium salt to first magnesium salt" as used herein refers to a value corresponding to "$N_{second\ Mg\ salt}/N_{first\ Mg\ salt}$", where "$N_{first\ Mg\ salt}$" denotes the amount of substance of the first magnesium salt and "$N_{second\ Mg\ salt}$" denotes the amount of substance of the second magnesium salt. The inclusion of the second magnesium salt in the electrolytic solution (particularly, an electrolytic solution containing a linear ether solvent described below as the solvent) at such a molar ratio contributes to further reduction of overvoltage and further improvement of energy density in the electrochemical device according to an embodiment. The amounts are not particularly limited, but regarding the combination of $Mg(HMDS)_2$ and $Mg(TFSI)_2$ as an example, the molar ratio of $Mg(HMDS)_2$:$Mg(TFSI)_2$ may be about 1:0.5 to 2.0, for example, about 1:0.5 to 1.25.

In the electrochemical device according to an embodiment, the electrolytic solution may further contain another magnesium salt as an electrolyte in addition to the first magnesium salt and the second magnesium salt. Such another magnesium salt is not configured in the form of halogen as in the halide ion described above, and may be, for example, at least one magnesium salt selected from the group consisting of magnesium nitrate ($Mg(NO_3)_2$), magnesium sulfate ($MgSO_4$), magnesium acetate ($Mg(CH_3COO)_2$), and magnesium tetraphenylborate ($Mg(B(C_6H_5)_4)_2$).

The solvent is preferably a linear ether among ether-based solvents. That is, preferably, an ether having a molecule in a linear structure forms the magnesium electrode-based electrolytic solution solvent, not a cyclic ether such as tetrahydrofuran. Simply speaking, the solvent in the magnesium electrode-based electrolytic solution according to an embodiment is preferably a linear ether solvent.

In the electrochemical device according to an embodiment, the linear ether solvent is preferably an ether represented by General Formula (3):

[Chemical Formula 7]

(3)

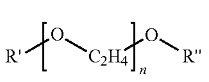

in General Formula (3), R' and R" are each independently a hydrocarbon group having 1 or more and 10 or less carbon atoms, and may be the same as or different from each other, and n is an integer of 1 or more and 10 or less.

In such a magnesium electrode-based electrochemical device, the linear ether of the electrolytic solution solvent has an ethyleneoxy structural unit. As described above, in the linear ether having such an ethyleneoxy structural unit, R' and R" in General Formula (3) may each independently be an aliphatic hydrocarbon group having 1 or more and 10 or less carbon atoms. In the linear ether having such an ethyleneoxy structural unit, n in General Formula (3) may be an integer of 2 or more and 4 or less, and thus, the linear ether solvent may be an ether having two or more and four or less ethyleneoxy structural units. In the solvent of the linear ether having an "ethyleneoxy structural unit", in General Formula (3), R' and R" may each independently be a lower alkyl group having 1 or more and 4 or less carbon atoms. In the linear ether solvent having an "ethyleneoxy structural unit", in General Formula (3), R' and R" may be the same alkyl groups.

Although it is only an example, in the magnesium electrode-based electrochemical device according to an embodiment, the linear ether solvent having "ethyleneoxy structural units" may be at least one selected from the group consisting of ethylene glycol dimethyl ether (dimethoxyethane), diethylene glycol dimethyl ether, triethylene glycol dimethyl ether, tetraethylene glycol dimethyl ether, pentaethylene glycol dimethyl ether, hexaethylene glycol dimethyl ether, and polyethylene glycol dimethyl ether.

In the magnesium electrode-based electrochemical device, preferably, the linear ether of the electrolytic solution solvent thereof coexists with the first magnesium salt, and such a first magnesium salt has a disilazide structure represented by the General Formula (1) above. When the linear ether as the solvent and the first magnesium salt coexist in the electrolytic solution, the overvoltage is further reduced and the energy density is further improved in the magnesium electrode-based electrochemical device according to an embodiment.

The first magnesium salt coexisting with the linear ether used as the electrolytic solution solvent of the magnesium electrode-based electrochemical device is a metal salt having a disilazide structure represented by General Formula (1) above. As described above, R in the disilazide structure of the first magnesium salt may be an aliphatic hydrocarbon group having 1 or more and 10 or less carbon atoms, which may consist of saturated hydrocarbons or may consist of unsaturated hydrocarbons. For example, the aliphatic hydrocarbon group may be an alkyl group, preferably a lower alkyl group having 1 or more and 4 or less carbon atoms. A preferred embodiment is a first magnesium salt having a methyl group in a disilazide structure. Such a first magnesium salt may be, for example, magnesium bis(hexamethyldisilazide), that is, $Mg(HMDS)_2$. With the use of such a first magnesium salt, in the electrochemical device (particularly a magnesium electrode-based device), the overvoltage is reduced and the improvement in energy density is easily exerted. Such magnesium bis(hexamethyldisilazide) is combined with the second magnesium salt, and thus, in the electrochemical device, the overvoltage is further reduced and the improvement in energy density is more easily exerted.

The second magnesium salt coexisting with the linear ether used as the electrolytic solution solvent of the magnesium electrode-based electrochemical device is preferably represented by General Formula (2) above.

In the electrochemical device according to an embodiment, the positive electrode is preferably a sulfur electrode containing at least sulfur. That is, the sulfur electrode of the electrochemical device according to an embodiment is preferably configured as a positive electrode of sulfur (S) such as $S_8$ and/or polymeric sulfur. Since the negative electrode is a magnesium electrode, the electrochemical device according to an embodiment is an electrochemical device including a magnesium electrode-sulfur electrode pair, and by including a suitable electrolytic solution therein, the energy density can be improved.

Since the sulfur electrode is an electrode containing at least sulfur, the sulfur electrode may contain a conductive auxiliary agent and/or a binder, or the like, in addition to this. In such a case, the sulfur content in the sulfur electrode may be 5% by mass or more and 95% by mass or less, and preferably 70% by mass or more and 90% by mass or less based on the entire electrode.

Examples of the conductive auxiliary agent contained in the sulfur electrode used as a positive electrode include carbon materials such as graphite, carbon fiber, carbon black, and carbon nanotubes, and these can be used singly or in mixture of two or more kinds thereof. As the carbon fiber, for example, a vapor growth carbon fiber (VGCF (registered trademark)) or the like can be used. As the carbon black, for example, acetylene black and/or Ketjen black, or the like can be used. As the carbon nanotube, for example, a single-wall carbon nanotube (SWCNT) and/or a multi-wall carbon nanotube (MWCNT) such as a double-wall carbon nanotube (DWCNT), or the like can be used. A material other than the carbon materials can also be used as long as the material has good conductivity, and for example, a metal material such as a Ni powder, and/or a conductive polymer material or the like can also be used. Examples of the binder contained in the sulfur electrode used as a positive electrode include polymer resins such as fluorine-based resins such as polyvinylidene fluoride (PVdF) and/or polytetrafluoroethylene (PTFE), polyvinyl alcohol (PVA)-based resins, and/or styrene-butadiene copolymer rubber (SBR)-based resins. A conductive polymer may be used as the binder. As the conductive polymer, for example, a substituted or unsubstituted polyaniline, polypyrrole, or polythiophene, a (co) polymer formed of one or two thereof, and the like can be used.

On the other hand, in the electrochemical device according to an embodiment, a material (specifically, a negative electrode active material) constituting the negative electrode is, because of the "magnesium electrode", formed of metal element magnesium, a magnesium alloy, or a magnesium compound. When the negative electrode is composed of a simple substance of magnesium metal (for example, a magnesium plate), a Mg purity of the simple substance is 90% or more, preferably 95% or more, and more preferably 98% or more. The negative electrode can be produced from, for example, a plate-like material or a foil-like material, but is not limited thereto, and can be formed (shaped) using a powder.

The negative electrode may have a structure in which a negative electrode active material layer is formed in the vicinity of the surface the negative electrode. For example, the negative electrode may include, as the negative electrode active material layer, a layer containing magnesium (Mg), further containing at least any of carbon (C), oxygen (O), sulfur (S) and a halogen, and having magnesium ion conductivity. Such a negative electrode active material layer may be one having a single peak derived from magnesium in the range of 40 eV or more and 60 eV or less, which is, however, no more than an example. The halogen is, for example, at least one selected from the group consisting of fluorine (F), chlorine (Cl), bromine (Br), and iodine (I). In such a case, the negative electrode active material layer may have a single peak derived from magnesium in the range of 40 eV or more and 60 eV or less over a region from the surface of the negative electrode active material layer to a depth of $2\times10^{-7}$ m in a direction perpendicular to the surface (depth direction). This is because the negative electrode active material layer exhibits good electrochemical activity from the surface to the inside thereof. Due to the same reason, the negative electrode active material layer may have an almost constant oxidation state of magnesium from the surface thereof across to a distance of $2\times10^{-7}$ nm in the depth direction. Here, the surface of the negative electrode active material layer means a surface on a side constituting a surface of the electrode of both surfaces of the negative electrode active material layer, and the rear surface of the negative electrode active material layer means a surface on a side opposite from the surface, that is, a surface on a side constituting an interface between a current collector and the negative electrode active material layer. Whether or not the negative electrode active material layer contains the above elements can be examined based on an X-ray photoelectron spectroscopy (XPS) method. It is also possible to similarly confirm by the XPS that the negative electrode active material layer has the peak described above and an oxidation state of magnesium.

In the electrochemical device according to an embodiment, preferably, the positive electrode and the negative electrode are separated from each other by an inorganic or organic separator through which magnesium ions can pass, while preventing the occurrence of short circuit due to the contact between the positive electrode and the negative electrode. Examples of the inorganic separator include a glass filter and glass fiber. Examples of the organic separator include a synthetic resin porous film including polytetrafluoroethylene, polypropylene, and/or polyethylene, or the like, and can have a structure in which two or more kinds of these porous films are laminated. Among these, a polyolefin porous membrane is preferable since this has an excellent short circuit preventing effect and can improve the safety of the battery by the shutdown effect.

An electrolyte layer in the electrochemical device can be formed of the electrolytic solution according to an embodiment and a polymer compound formed of a retention body retaining the electrolytic solution. The polymer compound may be swollen by the electrolytic solution. In this case, the polymer compound swollen by the electrolytic solution may be in a gel state. Examples of the polymer compound include polyacrylonitrile, polyvinylidene fluoride, a copolymer of vinylidene fluoride and hexafluoropropylene, polytetrafluoroethylene, polyhexafluoropropylene, polyethylene oxide, polypropylene oxide, polyphosphazene, polysiloxane, polyvinyl acetate, polyvinyl alcohol, polymethyl methacrylate, polyacrylic acid, polymethacrylic acid, styrene-butadiene rubber, nitrile-butadiene rubber, polystyrene and/or polycarbonate. In particular, polyacrylonitrile, polyvinylidene fluoride, polyhexafluoropropylene, or polyethylene oxide may be used when electrochemical stability is more important. The electrolyte layer may be a solid electrolyte layer.

The magnesium electrode-based electrochemical device described above can be configured as a secondary battery, and a conceptual diagram in that case is illustrated in FIG. 1. As illustrated in the drawing, during charging, magnesium ions ($Mg^{2+}$) move from a positive electrode 10 to a negative electrode 11 through an electrolyte layer 12 to convert electrical energy into chemical energy and store electricity. During discharging, magnesium ions return from the negative electrode 11 to the positive electrode 10 through the electrolyte layer 12 to generate electric energy.

When the electrochemical device is formed as a battery (a primary battery or a secondary battery) including the electrolytic solution according to an embodiment, the battery can be used as a driving power source or an auxiliary power source of, for example, a notebook personal computer, a PDA (personal digital assistant), a mobile phone, a smartphone, a cordless phone base unit/handset, a video camera, a digital still camera, an electronic book, an electronic dictionary, a portable audio player, a radio, a headphone, a game device, a navigation system, a memory card, a pacemaker, a hearing aid, a power tool, an electric shaver, a refrigerator, an air conditioner, a TV receiver, a stereo, a water heater, a microwave, a dishwasher, a washing machine, a dryer, a lighting device, a toy, a medical device, a robot, a load conditioner, a traffic light, a railway vehicle, a golf cart, an electric cart, and/or an electric car (including a hybrid car). In addition, the battery can be mounted on a building such as a house, a power source for power storage that is used for power generation facilities, or the like, or can be used in order to supply electric power thereto. In an electric car, a conversion device that converts electric power into a driving force by supplying electric power is generally a motor. Examples of the control device (control unit) that processes information related to vehicle control includes a control device that displays the remaining battery level based on information on the remaining battery level. The battery can also be used in an electric storage device in a so-called smart grid. Such a power storage device can not only supply electric power but also store electric power by receiving electric power supply from other power source. As the "other power source", for example, thermal power generation, nuclear power generation, hydroelectric power generation, a solar battery, wind power generation, geothermal power generation, and/or a fuel cell (including a biofuel cell), or the like can be used.

The electrochemical device according to an embodiment (that is, the secondary battery) is applicable to a battery pack including a secondary battery, control means (or a control unit) that performs control involving the secondary battery, and an exterior enclosing the secondary battery. In the battery pack, the control means can control, for example, charge/discharge, overdischarge or overcharge of the secondary battery.

The electrochemical device according to an embodiment (that is, a secondary battery) can also be applied to an electronic device that receives electric power from a secondary battery.

The electrochemical device according to an embodiment (that is, a secondary battery) can also be applied to electrically driven vehicles having a converter that receives power from the secondary battery and converts the power into the driving force of the vehicle, and a control device (or a control unit) that processes information related to vehicle control based on information on the secondary battery. In such an electrically driven vehicle, the conversion device typically receives electric power from the secondary battery, drives a motor, and generates a driving force. The motor can be driven also by utilizing regenerative energy. The control device (or a control unit) performs information processing related to vehicle control based on, for example, the remaining battery level of the secondary battery. Examples of such an electrically driven vehicle include an electric car, an electric motorcycle, an electric bicycle, and a railway vehicle, and also a so-called hybrid vehicle.

The electrochemical device according to an embodiment can be applied to a secondary battery in an electric power system configured to receive supply of electric power from a secondary battery and/or supply electric power from a power source to a secondary battery. Such a power system may be any power system as long as the power system uses electric power, and includes a mere power device. Such power systems include, for example, smart grids, household energy management systems (HEMS), and/or vehicles, or the like, and can also store electricity.

The electrochemical device according to an embodiment (that is, secondary battery) can be applied to a power source for power storage configured to have a secondary battery and be connected to an electronic device to which electric power is supplied. This power source for power storage can be basically used for any power system or power device regardless of the application of the power source for power storage, and can be used for a smart grid, for example.

Other matters such as more detailed matters and more specific modes of the electrochemical device according to an embodiment are described above, and the description is omitted to avoid duplication.

Here, a case where the magnesium electrode-based electrochemical device according to an embodiment is provided as a secondary battery will be described in more detail. Hereinafter, such a secondary battery is also referred to as a "magnesium secondary battery".

The magnesium secondary battery as the electrochemical device according to an embodiment can be applied, without any particular limitation, to a machine, a device, a tool, an apparatus, and a system (an assembly of a plurality of devices or the like) which can be used as a power source for driving/operating the secondary battery or an electric power storage source for accumulating electric power. The magnesium secondary battery to be used as a power source (for example, a magnesium-sulfur secondary battery) may be either a main power source (a power source to be used preferentially) or an auxiliary power source (a power source to be used instead of the main power source or a power source to be used by switching from the main power source). When a magnesium secondary battery is used as an auxiliary power source, the main power source is not limited to a magnesium secondary battery.

Examples of applications of the magnesium secondary battery (particularly the magnesium-sulfur secondary battery) include various electronic devices such as video cameras, camcoders, digital still cameras, mobile phones, personal computers, television receivers, various display devices, cordless phones, headphone stereos, music players, portable radios, electronic books, and/or electronic papers such as electronic newspapers, portable information terminals including PDAs, and electrical devices (including portable electronic devices); toys; portable living appliances such as electric shavers; lighting appliances such as interior lights; medical electronic devices such as pacemakers and/or hearing aids; storage devices such as memory cards; battery packs used for personal computers as removable power sources; power tools such as electric drills and/or electric saws; electric power storage systems such as household battery systems that store power in case of emergency, home energy servers (household power storage devices), and electric power supply systems; power storage units and/or backup power sources; electrically driven vehicles such as electrically driven cars, electrically driven bikes, electrically driven bicycles, and/or Segway (registered trademark); driving electric power converters (specifically, for example, power motors) for aircraft and/or ships, and however, the present application is not limited to these uses.

Among them, the magnesium secondary battery (particularly the magnesium-sulfur secondary battery) is effectively applied to battery packs, electrically driven vehicles, electric power storage systems, electric power supply systems, power tools, electronic devices, and/or electrical devices, or the like. The battery pack is a power source using a magnesium secondary battery, and is a so-called assembled battery or the like. The electrically driven vehicle is a vehicle that operates (for example, travels) using a magnesium secondary battery as a driving power source, and may be an automobile also including a driving source other than the secondary battery (for example, a hybrid car). An electric power storage system (for example, an electric power supply system) is a system using a magnesium secondary battery as an electric power storage source. For example, in a household electric power storage system (for example, an electric power supply system), electric power is accumulated in a magnesium secondary battery which is an electric power storage source and household electric appliances and the like can be thus used by utilizing the electric power. A power tool is a tool in which a moving unit (for example, a drill) moves using a magnesium secondary battery as a driving power source. Electronic devices and electrical devices are devices which exert various functions using a magnesium secondary battery as a power source for operation (namely, a power supply source).

Hereinafter, a cylindrical magnesium secondary battery and a flat laminate film type magnesium secondary battery will be described.

Figure 2:
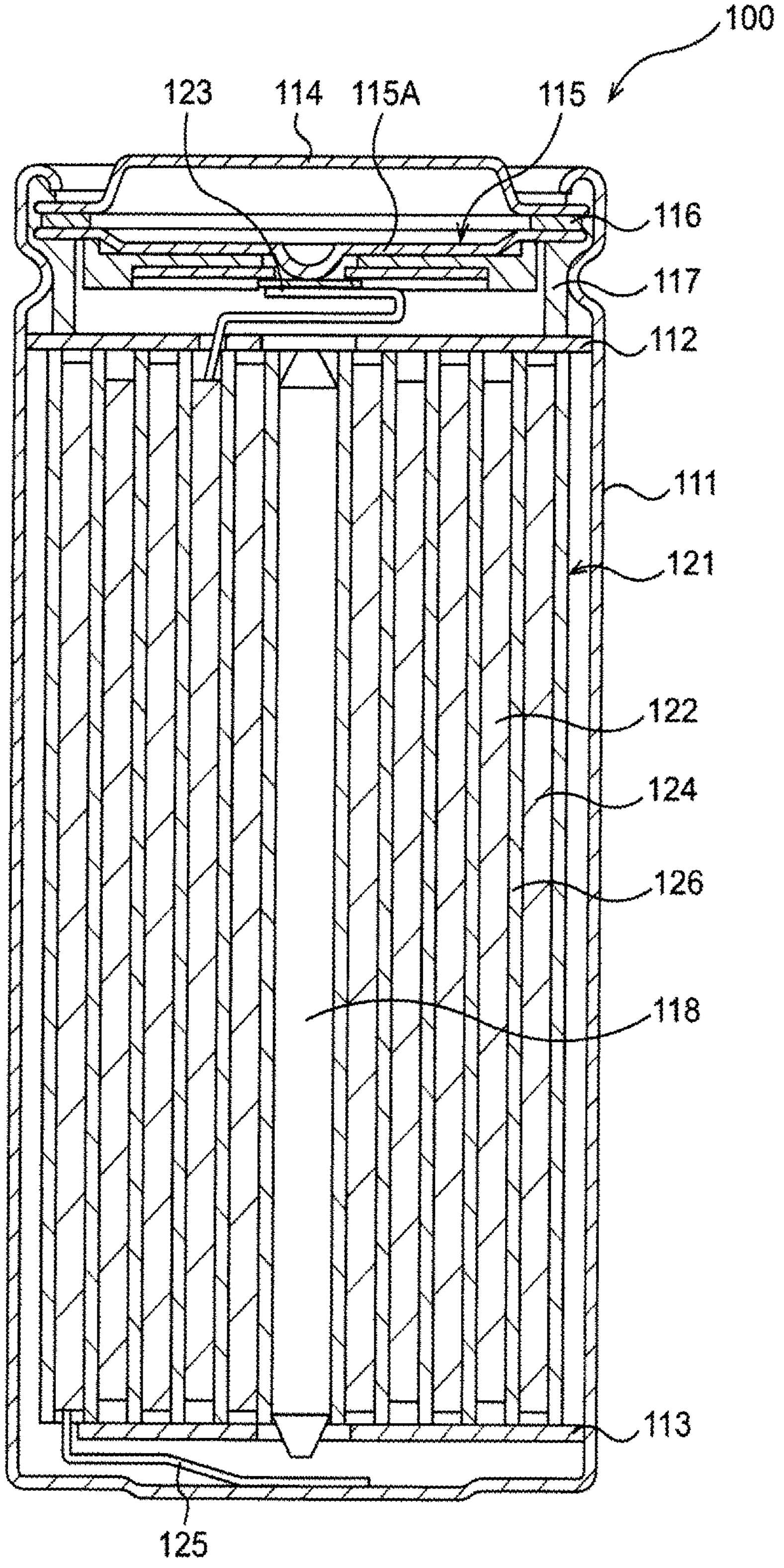
FIG. 2 is a schematic sectional view of a magnesium secondary battery (cylindrical magnesium secondary battery) provided as an embodiment of the present application.

FIG. 2 illustrates a schematic sectional view of a cylindrical magnesium secondary battery 100. In the magnesium secondary battery 100, an electrode structure 121 and a pair of insulating plates 112 and 113 are housed inside an electrode structure housing member 111 having a substantially hollow columnar shape. The electrode structure 121 can be produced, for example, by stacking a positive electrode 122 and a negative electrode 124 with a separator 126 interposed therebetween to obtain an electrode structure and then winding the electrode structure. The electrode structure housing member (for example, a battery can) 111 has a hollow structure in which one end is closed and the other end is open, and is produced using iron (Fe) and/or aluminum (Al), or the like. The pair of insulating plates 112 and 113 are disposed so as to sandwich the electrode structure 121 and extend perpendicularly to the winding peripheral face of the electrode structure 121. A battery lid 114, a safety valve mechanism 115, and a positive temperature coefficient element (for example, PTC element) 116 are crimped to the open end portion of the electrode structure housing member 111 with a gasket 117 interposed therebetween, and the electrode structure housing member 111 is thus sealed. The battery lid 114 is produced using, for example, the same material as that for the electrode structure housing member 111. The safety valve mechanism 115 and the positive temperature coefficient element 116 are provided on the inner side of the battery lid 114, and the safety valve mechanism 115 is electrically connected to the battery lid 114 with the positive temperature coefficient element 116 interposed therebetween. In the safety valve mechanism 115, a disk plate 115A is reversed when the internal pressure is raised to a certain level or more by an internal short circuit and/or external heating, or the like. As a result, the electrical connection between the battery lid 114 and the electrode structure 121 is disconnected. In order to prevent abnormal heat generation due to a large amount of current, the resistance of the positive temperature coefficient element 116 increases as the temperature rises. The gasket 117 is produced using, for example, an insulating material. The surface of the gasket 117 may be coated with asphalt or the like.

A center pin 118 is inserted into the winding center of the electrode structure 121. However, the center pin 118 may not be inserted into the winding center. A positive electrode lead portion 123 produced using a conductive material such as aluminum is connected to the positive electrode 122. Specifically, the positive electrode lead portion 123 is attached to a positive electrode current collector. A negative electrode lead portion 125 produced using a conductive material such as copper is connected to the negative electrode 124. Specifically, the negative electrode lead portion 125 is attached to a negative electrode current collector. The negative electrode lead portion 125 is welded to the electrode structure housing member 111 and is electrically connected to the electrode structure housing member 111. The positive electrode lead portion 123 is welded to the safety valve mechanism 115 as well as is electrically connected to the battery lid 114. In the example illustrated in FIG. 2, the negative electrode lead portion 125 is provided at one location (the outermost peripheral portion of the wound electrode structure), but may be provided at two locations (the outermost peripheral portion and innermost peripheral portion of the wound electrode structure).

The electrode structure 121 includes the positive electrode 122 having a positive electrode active material layer formed on the positive electrode current collector (more specifically, on both surfaces of the positive electrode current collector) and the negative electrode 124 having a negative electrode active material layer formed on the negative electrode current collector (more specifically, on both surfaces of the negative electrode current collector) stacked with the separator 126 interposed therebetween. The positive electrode active material layer is not formed in a region of the positive electrode current collector to which the positive electrode lead portion 123 is attached, and the negative electrode active material layer is not formed in a region of the negative electrode current collector to which the negative electrode lead portion 125 is attached.

The magnesium secondary battery 100 can be manufactured, for example, based on the following procedure.

First, positive electrode active material layers are formed on both surfaces of the positive electrode current collector, and negative electrode active material layers are formed on both surfaces of the negative electrode current collector.

Subsequently, the positive electrode lead portion 123 is attached to the positive electrode current collector by a welding method or the like. The negative electrode lead portion 125 is attached to the negative electrode current collector by a welding method or the like. Subsequently, the positive electrode 122 and the negative electrode 124 are stacked with the separator 126 including a microporous polyethylene film interposed therebetween, and are wound (more specifically, the electrode structure (that is, stacked structure) of the positive electrode 122/the separator 126/the negative electrode 124/the separator 126 is wound) to produce the electrode structure 121, and then, a protective tape (not illustrated) is attached to an outermost peripheral portion. Thereafter, the center pin 118 is inserted into a center of the electrode structure 121. Subsequently, the electrode structure 121 is housed inside the electrode structure housing member 111 while the electrode structure 121 is sandwiched between the pair of insulating plates 112 and 113. In this case, a tip of the positive electrode lead portion 123 is attached to the safety valve mechanism 115, and a tip of the negative electrode lead portion 125 is attached to the electrode structure housing member 111 using a welding method or the like. Thereafter, the electrolytic solution is injected based on the reduced pressure method to impregnate the separator 126 with the electrolytic solution. Subsequently, the battery lid 114, the safety valve mechanism 115, and the positive temperature coefficient element 116 are crimped at the opening end portion of the electrode structure housing member 111 with the gasket 117 interposed therebetween.

Figure 3:
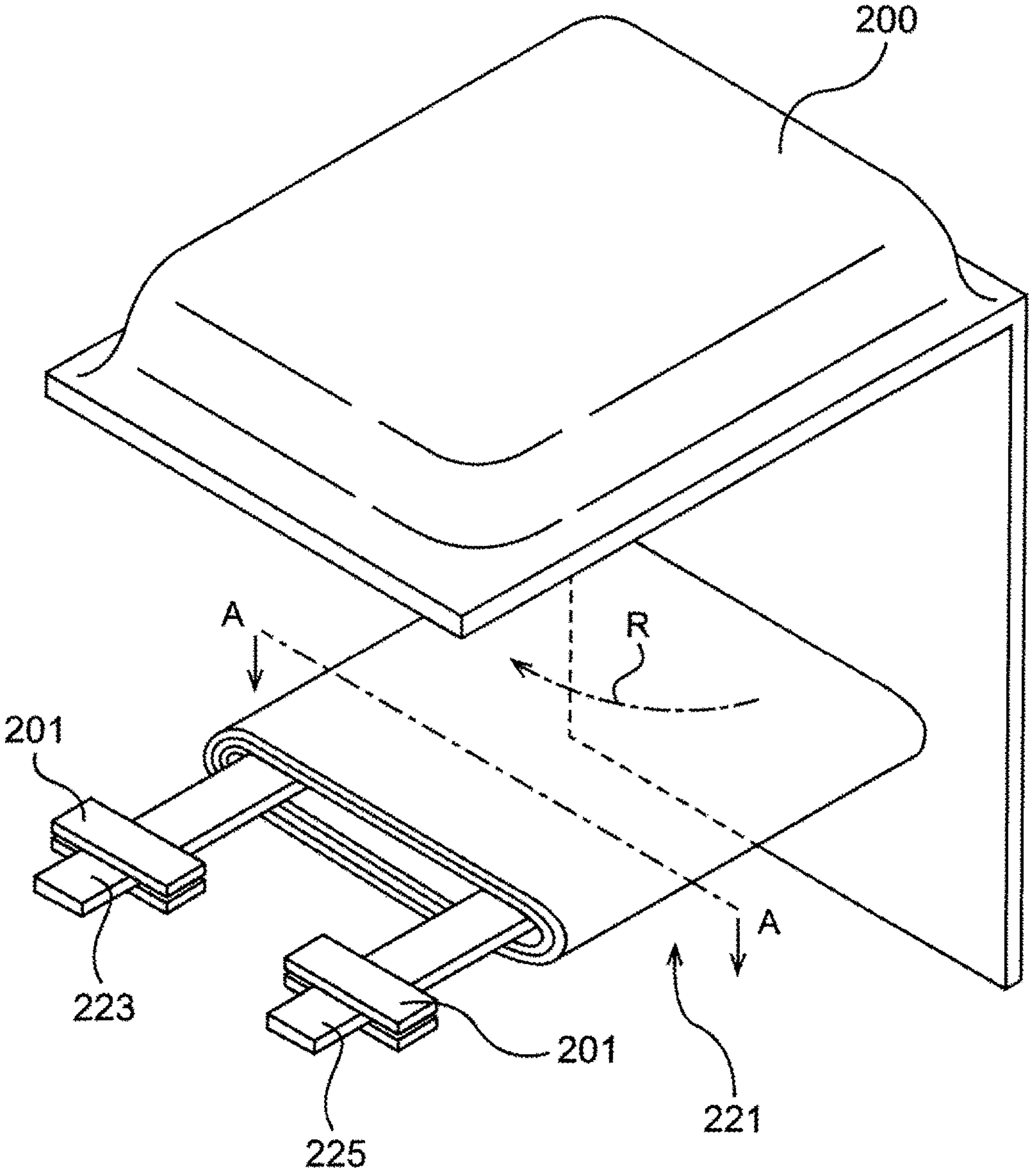
FIG. 3 is a schematic perspective view of a magnesium secondary battery (flat laminate film type magnesium secondary battery) provided as an embodiment of the present application.

Next, a flat laminate film type secondary battery will be described. FIG. 3 illustrates a schematic exploded perspective view of such a secondary battery. In this secondary battery, an electrode structure 221 basically the same as that described above is housed inside an exterior member 200 formed of a laminate film. The electrode structure 221 can be produced by stacking a positive electrode and a negative electrode with a separator and an electrolyte layer interposed therebetween and then winding this stacked structure. A positive electrode lead portion 223 is attached to the positive electrode and a negative electrode lead portion 225 is attached to the negative electrode. The outermost peripheral portion of the electrode structure 221 is protected by a protective tape. The positive electrode lead portion 223 and the negative electrode lead portion 225 protrude in the same direction from the inside to the outside of the exterior member 200. The positive electrode lead portion 223 is formed using a conductive material such as aluminum. The negative electrode lead portion 225 formed using a conductive material such as copper, nickel, and/or stainless steel, or the like.

The exterior member 200 is a single film foldable in the direction of the arrow R illustrated in FIG. 3, and a recess (for example, emboss) for housing the electrode structure 221 is provided in a part of the exterior member 200. The exterior member 200 is, for example, a laminate film in which a fusion layer, a metal layer, and a surface protective layer are stacked in this order. In a step of manufacturing the secondary battery, the exterior member 200 is folded such that the fusion layers face each other with the electrode structure 221 interposed therebetween, and then the outer peripheral edges of the fusion layers are fused to each other. However, the exterior member 200 may be formed by bonding two separate laminate films to each other with an adhesive or the like interposed therebetween. The fusion layer is formed using, for example, a film of polyethylene and/or polypropylene, or the like. The metal layer is formed using, for example, an aluminum foil or the like. The surface protective layer is formed using, for example, nylon and/or polyethylene terephthalate, or the like. In particular, the exterior member 200 is preferably an aluminum laminate film in which a polyethylene film, an aluminum foil, and a nylon film are stacked in this order. However, the exterior member 200 may be a laminate film having another stacked structure, a polymer film such as polypropylene, or a metal film. Specifically, the exterior member 200 may include a moisture-resistant aluminum laminate film in which a nylon film, an aluminum foil, and an unstretched polypropylene film are stacked in this order from the outside.

An adhesive film 201 is inserted between the exterior member 200 and the positive electrode lead portion 223 and between the exterior member 200 and the negative electrode lead portion 225 in order to prevent the intrusion of outside air. The adhesive film 201 may be formed using a material exhibiting close contact property to the positive electrode lead portion 223 and the negative electrode lead portion 225, for example, a polyolefin resin or the like, more specifically, a polyolefin resin such as polyethylene, polypropylene, modified polyethylene, or modified polypropylene.

Although the above description has focused primarily on secondary batteries, the present disclosure also applies to other electrochemical devices such as capacitors, air batteries, and fuel cells. This will be described below.

Figure 4:
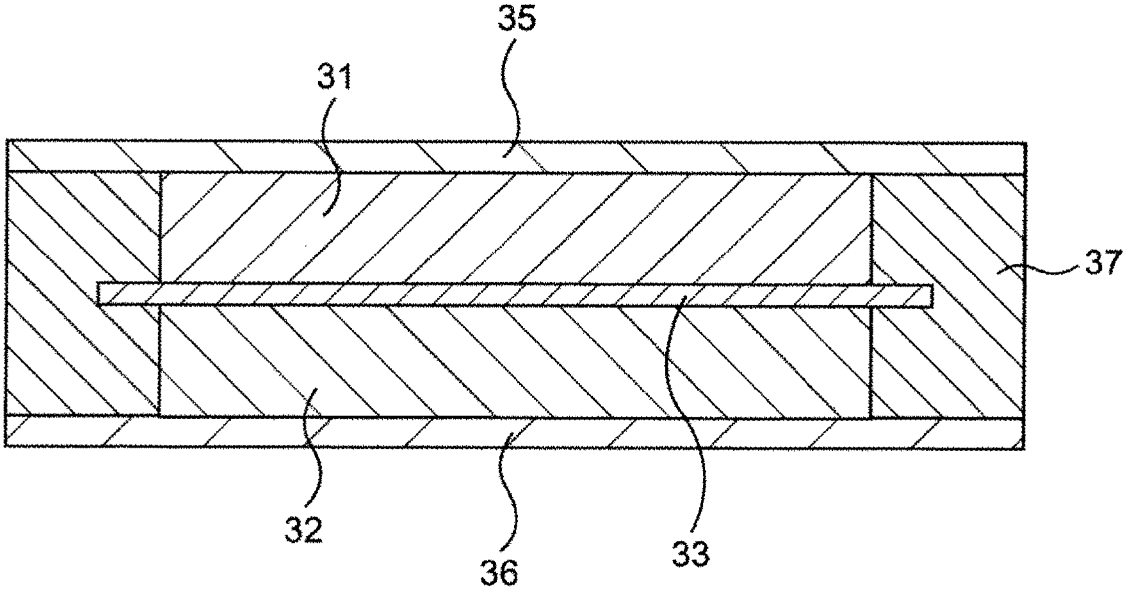
FIG. 4 is a schematic sectional view of an electrochemical device provided as a capacitor in an embodiment of the present application.

The electrochemical device according to an embodiment can be provided as a capacitor as illustrated in the schematic sectional view of FIG. 4. In the capacitor, a positive electrode 31 and a negative electrode 32 are disposed so as to face each other with a separator 33, which is impregnated with an electrolytic solution, interposed therebetween. A gel electrolyte membrane impregnated with the electrolytic solution according to an embodiment may be disposed on a surface of at least one of the separator 33, the positive electrode 31, and the negative electrode 32. Reference numerals 35 and 36 denote current collectors, and reference numeral 37 denotes a gasket.

Figure 5:
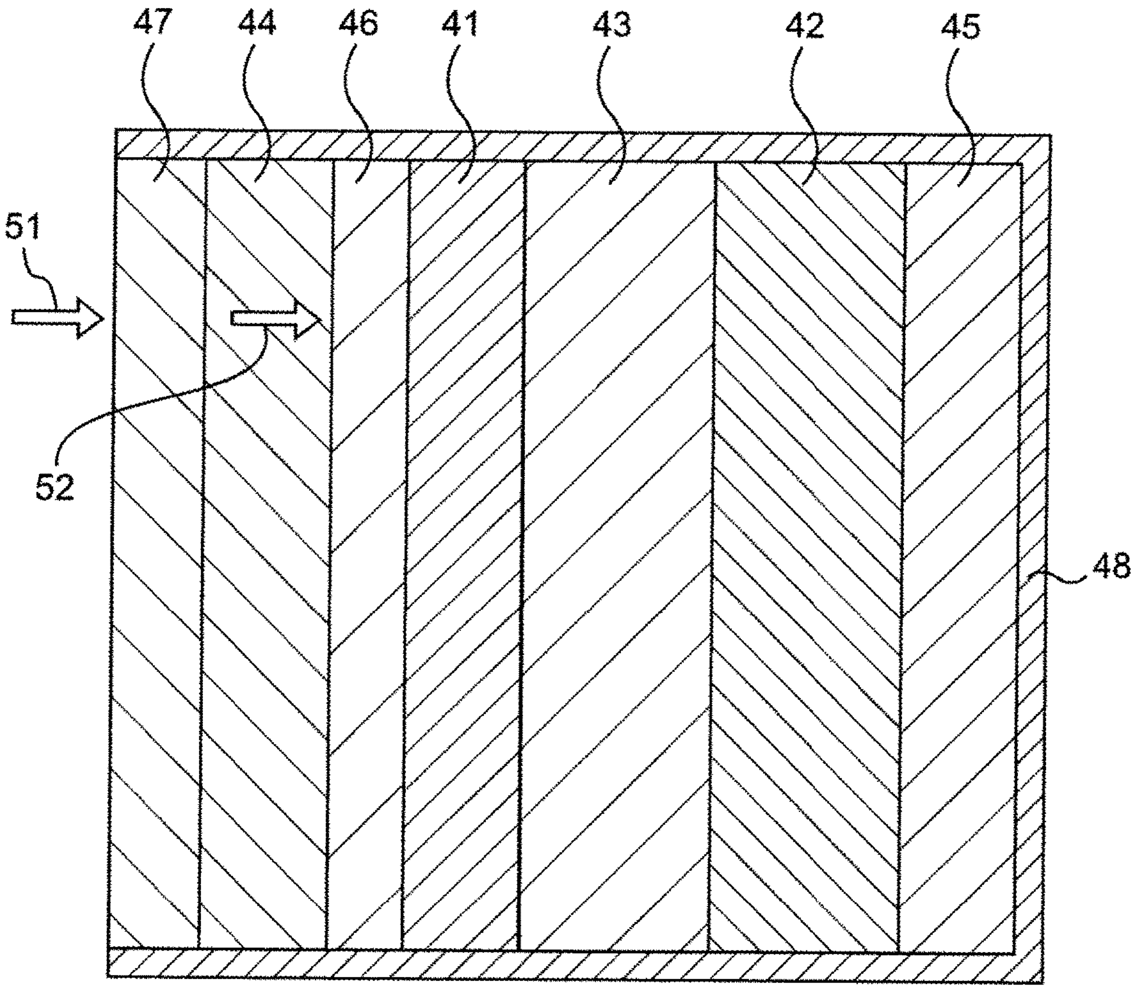
FIG. 5 is a schematic sectional view of an electrochemical device provided as an air battery in an embodiment of the present application.

Alternatively, the electrochemical device according to an embodiment can also be provided as an air battery as illustrated in the conceptual diagram of FIG. 5. Such an air battery includes, for example, an oxygen-selective permeable membrane 47 that hardly permeates water vapor and selectively permeates oxygen, an air electrode-side current collector 44 formed using a conductive porous material, a porous diffusion layer 46 disposed between the air electrode-side current collector 44 and a porous positive electrode 41 and formed using a conductive material, the porous positive electrode 41 containing a conductive material and a catalyst material, a separator and an electrolytic solution (or a solid electrolyte containing an electrolytic solution) 43 that hardly pass water vapor, a negative electrode 42 that emits magnesium ions, a negative electrode-side current collector 45, and an exterior body 48 that houses these layers.

Oxygen 52 in air (for example, atmosphere) 51 is selectively allowed to permeate the oxygen-selective permeable membrane 47, passes through the air electrode-side current collector 44 formed using the porous material, is diffused by the diffusion layer 46, and is supplied to the porous positive electrode 41. The travel of the oxygen that has permeated through the oxygen-selective permeable membrane 47 is blocked in part by the air electrode-side current collector 44, but since the oxygen that has passed through the air electrode-side current collector 44 is diffused and spread by the diffusion layer 46, the oxygen efficiently spreads over the entire porous positive electrode 41, and the supply of oxygen to the entire surface of the porous positive electrode 41 is not inhibited by the air electrode-side current collector 44. In addition, since the permeation of water vapor is controlled by the oxygen-selective permeable membrane 47, deterioration due to the influence of moisture in the air is small, and oxygen is efficiently supplied to the entire porous positive electrode 41, so that the battery output can be increased and the battery can be stably used for a long period.

Figure 6:
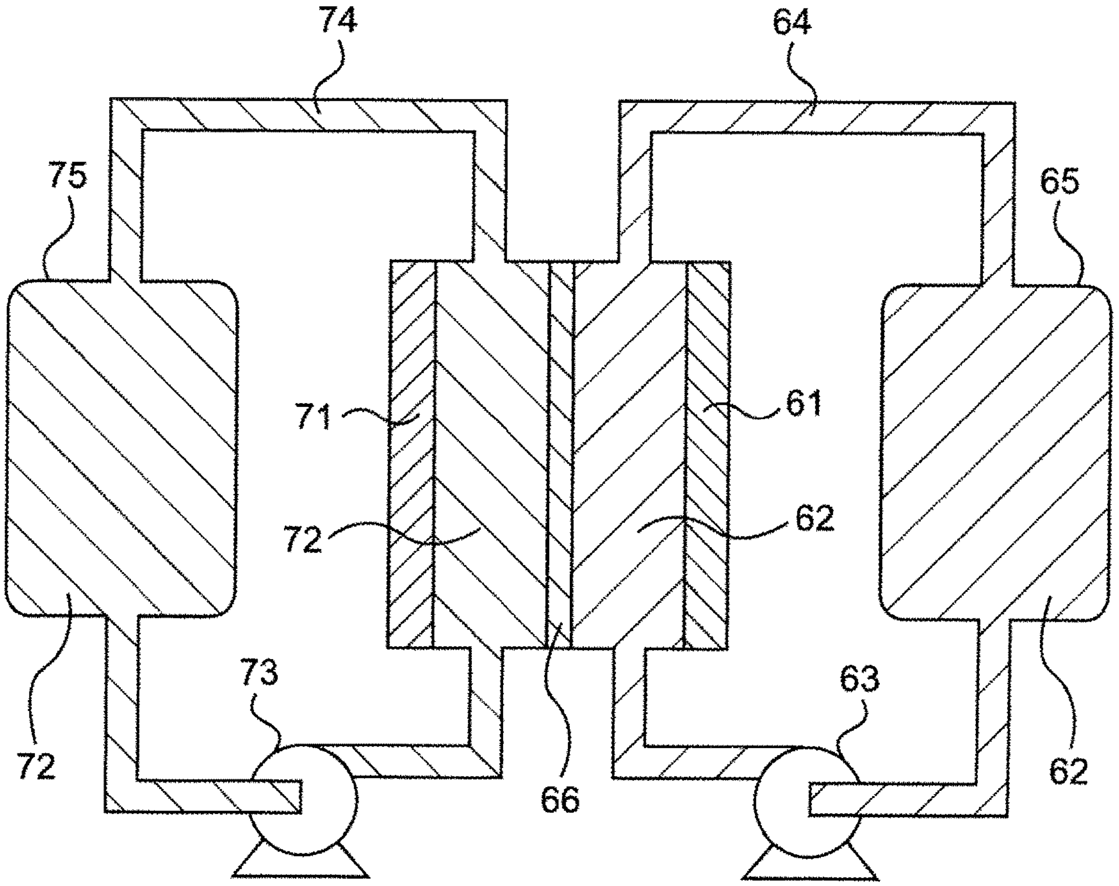
FIG. 6 is a schematic sectional view of an electrochemical device provided as a fuel cell in an embodiment of the present application.

Alternatively, the electrochemical device according to an embodiment can also be provided as a fuel cell as illustrated in the conceptual diagram of FIG. 6. The fuel cell includes, for example, a positive electrode 61, a positive electrode electrolytic solution 62, a positive electrode electrolytic solution transport pump 63, a fuel flow path 64, a positive electrode electrolytic solution storage container 65, a negative electrode 71, a negative electrode electrolytic solution 72, a negative electrode electrolytic solution transport pump 73, a fuel flow path 74, a negative electrode electrolytic solution storage container 75, and an ion exchange membrane 66. On the fuel flow path 64, the positive electrode electrolytic solution 62 continuously or intermittently flows (circulates) passing through the positive electrode electrolytic solution storage container 65 and the positive electrode electrolytic solution transport pump 63, on the fuel flow path 74, the negative electrode electrolytic solution 72 continuously or intermittently flows or circulates passing through the negative electrode electrolytic solution storage container 75 and the negative electrode electrolytic solution transport pump 73, and electric power is generated across the positive electrode 61 and the negative electrode 71. As the positive electrode electrolytic solution 62, a solution obtained by adding a positive electrode active material to the electrolytic solution according to an embodiment can be used, and as the negative electrode electrolytic solution 72, a solution obtained by adding a negative electrode active material to the electrolytic solution according to an embodiment can be used.

As for the negative electrode in the electrochemical device, a Mg metal plate can be used, and the negative electrode can also be produced by the following method. For example, a Mg electrolytic solution (Mg-EnPS) containing $MgCl_2$ and EnPS (ethyl-n-propyl sulfone) is prepared, and the Mg electrolytic solution may be used to precipitate metal Mg on a Cu foil by an electrolytic plating method, thus forming, as a negative electrode active material layer, a Mg plating layer on the Cu foil. An XPS analysis on a surface of the Mg plating layer obtained by this technique has resulted in clarifying the presence of Mg, C, O, S, and Cl on the surface of the Mg plating layer, a Mg-derived peak observed by the surface analysis has not been split, and a single Mg-derived peak has been observed in the range of 40 eV or more and 60 eV or less. Based on the Ar sputtering method, the surface of the Mg plating layer was dug about 200 nm in the depth direction, and the surface was analyzed based on the XPS method, and as a result, it was found that no change is observed in the position and shape of the Mg-derived peak after Ar sputtering compared with the position and shape of the peak before Ar sputtering.

The electrochemical device according to an embodiment can be particularly suitably used as a magnesium secondary battery as described with reference to FIGS. 1 to 3, and some application examples of the magnesium secondary battery will be described more specifically. It is noted that the configuration of each application example described below is merely an example and the configuration can be appropriately changed.

A magnesium secondary battery can be used in the form of a battery pack. Such a battery pack is a simple battery pack (so-called soft pack) using a magnesium secondary battery, and is mounted on, for example, an electronic device typified by a smartphone. Alternatively or additionally, the battery pack may include an assembled battery including six magnesium secondary batteries connected in 2 parallel and 3 series. The connection type of the magnesium secondary batteries may be in series, in parallel, or a combination of both.

Figure 7:
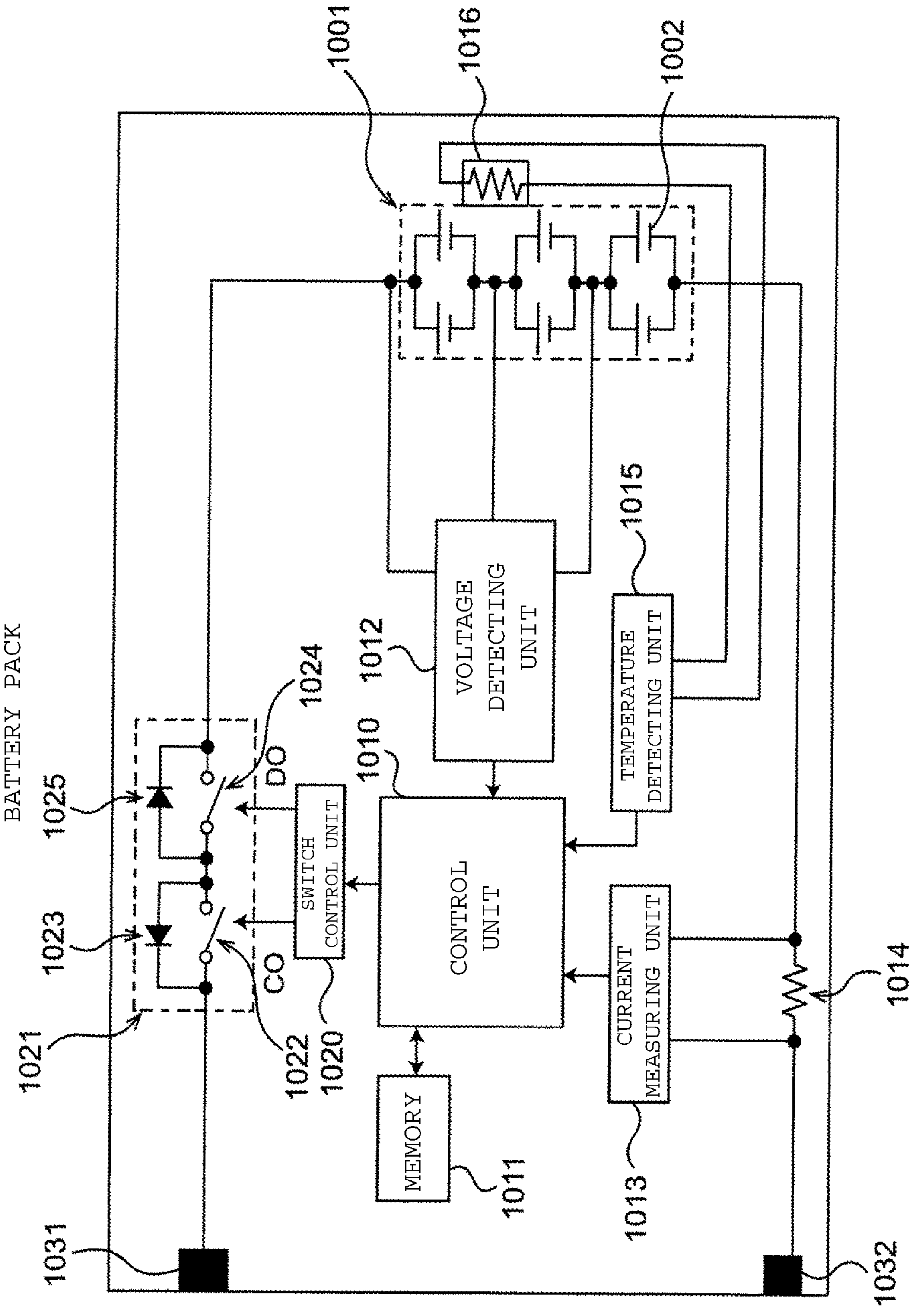
FIG. 7 is a block diagram illustrating a circuit configuration example when a magnesium secondary battery provided as an embodiment of the present application is applied to a battery pack.

FIG. 7 illustrates a block diagram illustrating a circuit configuration example in a case where the magnesium secondary battery according to an embodiment is applied to a battery pack. The battery pack includes a cell (for example, an assembled battery) 1001, an exterior member, a switch unit 1021, a current detection resistor 1014, a temperature detection element 1016, and a control unit 1010. The switch unit 1021 includes a charge control switch 1022 and a discharge control switch 1024. The battery pack also includes a positive electrode terminal 1031 and a negative electrode terminal 1032, and during charging, the positive electrode terminal 1031 and the negative electrode terminal 1032 are respectively connected to a positive electrode terminal and a negative electrode terminal of a charger, and the charge is thus performed. When an electronic device is used, the positive electrode terminal 1031 and the negative electrode terminal 1032 are connected to a positive electrode terminal and a negative electrode terminal of the electronic device, respectively and discharge is carried out.

The cell 1001 is configured by connecting a plurality of magnesium secondary batteries 1002 according to the present disclosure in series and/or in parallel. Although FIG. 7 illustrates a case where six magnesium secondary batteries 1002 are connected in 2 parallel and 3 series (2P3S), the connection method may be any the connection method such as p parallel and q series (where p and q are integers).

The switch unit 1021 includes the charge control switch 1022 and a diode 1023 and a discharge control switch 1024 and a diode 1025, and is controlled by the control unit 1010. The diode 1023 exhibits polarity in the backward direction with respect to the charge current flowing from the positive electrode terminal 1031 toward the cell 1001 and in the forward direction with respect to the discharge current flowing from the negative electrode terminal 1032 toward the cell 1001. The diode 1025 has a forward polarity with respect to the charge current and a backward polarity with respect to the discharge current. In the example, the switch unit is provided on the plus (+) side, but may be provided on the minus (−) side. The control unit 1010 controls the charge control switch 1022 such that the charge control switch 1022 is closed when the battery voltage has reached the overcharge detection voltage, and no charge current flows in the current path of the cell 1001. After the charge control switch 1022 is closed, only discharge can be performed through the diode 1023. The control unit 1010 controls the charge control switch 1022 such that the charge control switch 1022 is closed in a case where a large amount of current flows during charging, and a charge current flowing in a current path of the cell 1001 is cut off. The control unit 1010 controls the discharge control switch 1024 such that the discharge control switch 1024 is closed when the battery voltage has reached the overdischarge detection voltage, and no discharge current flows in the current path of the cell 1001. After the discharge control switch 1024 is closed, only charge can be performed through the diode 1025. The discharge control switch 1024 is put into a closed state when a large current flows during discharging, and is controlled by the control unit 1010 so as to cut off the discharge current flowing in the current path of the cell 1001.

The temperature detection element 1016 includes, for example, a thermistor and is provided in the vicinity of the cell 1001, and a temperature measuring unit 1015 measures the temperature of the cell 1001 using the temperature detection element 1016 and sends the measurement result to the control unit 1010. A voltage measuring unit 1012 measures the voltage of the cell 1001 and the voltage of each of the magnesium secondary batteries 1002 constituting the cell 1001, A/D converts the measurement results, and sends the converted result to the control unit 1010. A current measuring unit 1013 measures the current using the current detection resistor 1014, and sends the measurement result to the control unit 1010.

A switch control unit 1020 controls the charge control switch 1022 and the discharge control switch 1024 of the switch unit 1021 based on the voltage and current sent from the voltage measuring unit 1012 and the current measuring unit 1013. The switch control unit 1020 prevents overcharge, overdischarge, and overcurrent charge and discharge by sending a control signal to the switch unit 1021 when the voltage of any of the magnesium secondary batteries 1002 becomes equal to or less than the overcharge detection voltage or overdischarge detection voltage, and/or when a large current suddenly flows. The charge control switch 1022 and the discharge control switch 1024 each can be constituted of, for example, a semiconductor switch such as MOSFET. In this case, the diodes 1023 and 1025 are each constituted of a parasitic diode of MOSFET. In a case where a p-channel FET is used as a MOSFET, the switch control unit 1020 supplies a control signal DO and a control signal CO to the gates of the charge control switch 1022 and the discharge control switch 1024, respectively. The charge control switch 1022 and the discharge control switch 1024 become conductive due to a gate potential lower than the source potential by a predetermined value or more. That is, in normal charge and discharge operations, the control signals CO and DO are set at low levels, and the charge control switch 1022 and the discharge control switch 1024 are kept conductive. For example, at the time of overcharge or overdischarge, the control signal CO and the control signal DO are set to high levels, and the charge control switch 1022 and the discharge control switch 1024 are put into a closed state.

A memory 1011 includes, for example, an erasable programmable read only memory (EPROM) which is a non-volatile memory. The memory 1011 stores in advance a numerical value calculated by the control unit 1010 and/or an internal resistance value and the like of each of the magnesium secondary batteries 1002 in the initial state of the magnesium secondary battery measured at the stage of the manufacturing process, and these values can be appropriately rewritten. By storing the fully charged capacity of the magnesium secondary battery 1002, for example, the remaining capacity can be calculated together with the control unit 1010.

The temperature measuring unit 1015 measures the temperature using the temperature detection element 1016, performs charge and discharge control when abnormal heat generation occurs, and corrects the calculation of the remaining capacity.

Figure 8:
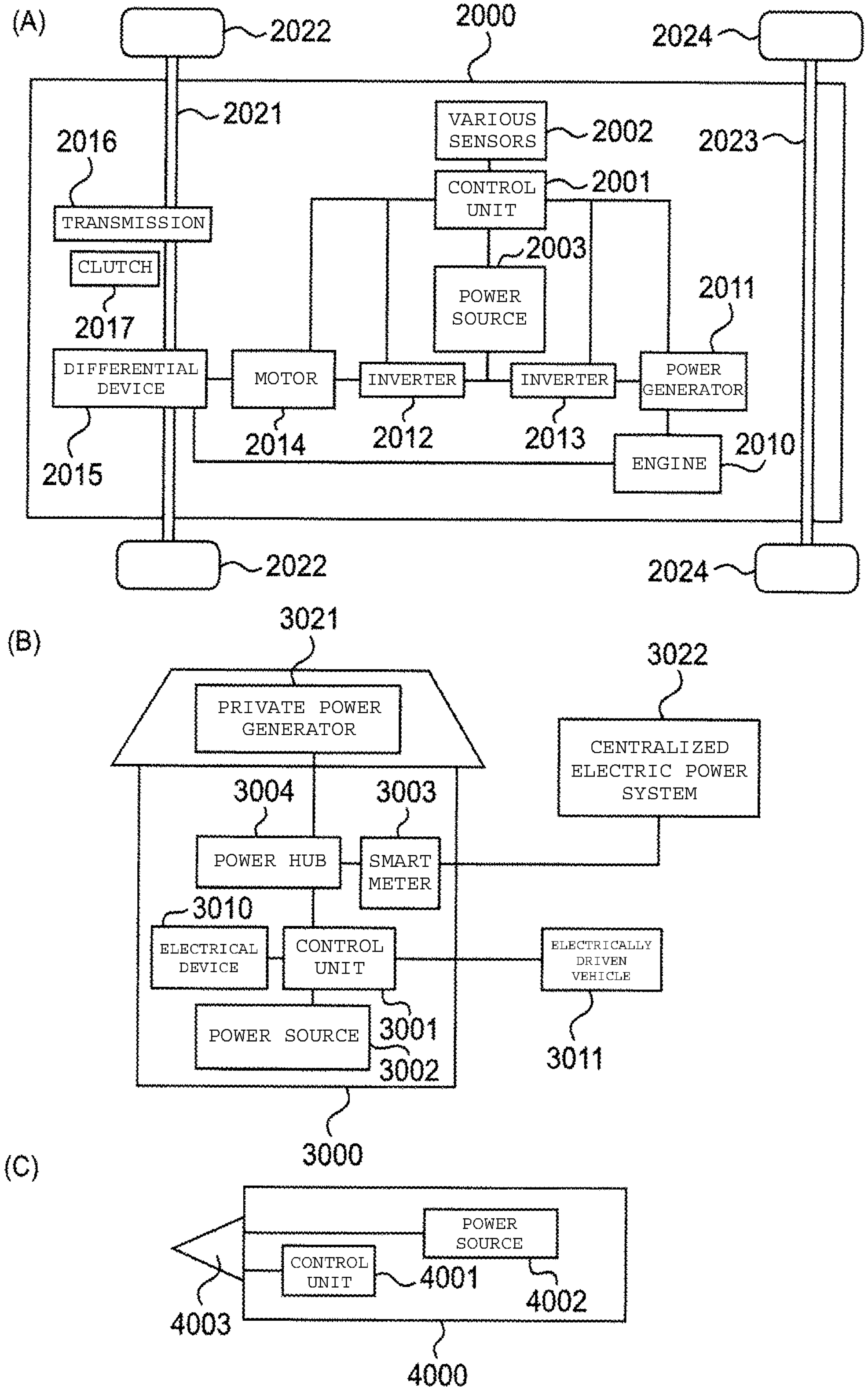
FIG. 8 shows views A-C which are block diagrams illustrating the configurations of an electrically driven vehicle, an electric power storage system, and a power tool to which a magnesium secondary battery is applied as an embodiment of the present application, respectively.

Next, the application of the magnesium secondary battery to an electrically driven vehicle will be described. FIG. 8A illustrates a block diagram illustrating a configuration of an electrically driven vehicle such as a hybrid car, which is one example of the electrically driven vehicle. The electrically driven vehicle includes, for example, a control unit 2001, various sensors 2002, a power source 2003, an engine 2010, a power generator 2011, inverters 2012 and 2013, a driving motor 2014, a differential device 2015, a transmission 2016, and a clutch 2017 in a metal housing 2000. In addition, the electrically driven vehicle includes, for example, a front wheel drive shaft 2021, front wheels 2022, a rear wheel drive shaft 2023, and rear wheels 2024 connected to the differential device 2015 and/or the transmission 2016.

The electrically driven vehicle can travel, for example, by using either of the engine 2010 or the motor 2014 as a driving source. The engine 2010 is a main source of power, and examples thereof include a gasoline engine. In the case of using the engine 2010 is used as a source of power, a driving force (for example, torque) of the engine 2010 is transmitted to, for example, the front wheels 2022 or the rear wheels 2024 through, for example, the differential device 2015, the transmission 2016, and the clutch 2017, which are drive units. The torque of the engine 2010 is also transmitted to the power generator 2011, the power generator 2011 generates alternating current power utilizing the torque, the alternating current power is converted into direct current power via the inverter 2013, and the direct current power is accumulated in the power source 2003. Meanwhile, in the case of using the motor 2014 which is a converter as a source of power, the electric power (for example, direct current power) supplied from the power source 2003 is converted into alternating current power via the inverter 2012, and the motor 2014 is driven utilizing the alternating current power. The driving force (for example, torque) converted from the power by the motor 2014 is transmitted to the front wheel 2022 or the rear wheel 2024 through, for example, the differential device 2015, the transmission 2016, and the clutch 2017, which are driving units.

When the electrically driven vehicle is decelerated by the brake mechanism (not illustrated), the resistance force at the time of deceleration may be transmitted to the motor 2014 as a torque, and the motor 2014 may generate alternating current power utilizing this torque. The alternating current power is converted into direct current power via the inverter 2012, and the direct current regenerative electric power is accumulated in the power source 2003.

The control unit 2001 is a unit that controls the operation of the entire electrically driven vehicle, and includes, for example, a CPU and the like. The power source 2003 can include one or two or more magnesium secondary batteries according to an embodiment (not illustrated). The power source 2003 also may be configured to be connected to an external power source and accumulate electric power by receiving power supply from the external power source. The various sensors 2002 are used, for example, to control the rotation speed of the engine 2010 and to control the opening degree (throttle opening degree) of a throttle valve (not illustrated). The various sensors 2002 include, for example, a speed sensor, an acceleration sensor, and/or an engine rpm sensor, and the like.

A case where the electrically driven vehicle is a hybrid vehicle has been described, but the electrically driven vehicle may be a vehicle (for example, an electric vehicle) which operates using only the power source 2003 and the motor 2014 without using the engine 2010.

Next, the application of the magnesium secondary battery to an electric power storage system (for example, an electric power supply system) will be described. FIG. 8B illustrates a block diagram illustrating the configuration of an electric power storage system (for example, an electric power supply system). The electric power storage system includes, for example, a control unit 3001, a power source 3002, a smart meter 3003, and a power hub 3004 inside a house 3000 such as a general residence and a commercial building.

The power source 3002 can be connected to, for example, an electrical device (for example, an electronic device) 3010 installed inside the house 3000 and an electrically driven vehicle 3011 stopped outside the house 3000. The power source 3002 can be connected to, for example, a private power generator 3021 installed in the house 3000 via the power hub 3004 and an external centralized electric power system 3022 via the smart meter 3003 and the power hub 3004. The electrical device (for example, an electronic device) 3010 includes, for example, one or two or more home appliances. Examples of home appliances include refrigerators, air conditioners, television receivers, and/or water heaters. The private power generator 3021 includes, for example, a solar power generator and/or a wind power generator. Examples of the electrically driven vehicle 3011 include an electrically driven cars, a hybrid vehicle, an electrically driven motorcycle, an electrically driven bicycle, and/or a Segway (registered trademark). Examples of the centralized electric power system 3022 can include commercial power sources, power generators, power grids, and/or smart grids (for example, next-generation power grids) and, for example, thermal power plants, nuclear power plants, hydropower plants, and/or wind power plants, and examples of power generation devices provided in the centralized electric power system 3022 include various solar cells, fuel cells, wind power generation devices, and/or micro-hydraulic power generation devices, geothermal power generation devices, and the like can be exemplified, but the present application is not limited to these.

The control unit 3001 controls the operation of the whole electric power storage system (including the usage state of the power source 3002), and includes, for example, a CPU and the like. The power source 3002 can include one or two or more magnesium secondary batteries according to an embodiment (not illustrated). The smart meter 3003 is, for example, a network-compatible power meter to be installed in the house 3000 on the power demand side, and can communicate with the power supply side. The smart meter 3003 enables efficient and stable energy supply, for example, by controlling the balance between the supply and demand of electric power in the house 3000 while communicating with the outside.

In this electric power storage system, for example, electric power from the centralized electric power system 3022 which is an external power source is accumulated in the power source 3002 via the smart meter 3003 and the power hub 3004 as well as from the private power generator 3021 which is an independent power source 3002 via the power hub 3004. The electric power accumulated in the power source 3002 is supplied to the electrical device (for example, an electronic device) 3010 and the electrically driven vehicle 3011 in accordance with the instruction from the control unit 3001, and thus the electrical device (for example, an electronic device) 3010 can be operated as well as the electrically driven vehicle 3011 can be charged. In other words, the electric power storage system is a system which allows the accumulation and supply of electric power in the house 3000 to be performed using the power source 3002.

The electric power accumulated in the power source 3002 can be arbitrarily utilized. For this reason, for example, electric power from the centralized electric power system 3022 can be accumulated in the power source 3002 at midnight at which the electricity usage fee is low, and the electric power accumulated in this power source 3002 can be used during the day during which the electricity usage fee is high.

The electric power storage system described above may be installed for each house (for example, one household) or for a plurality of houses (for example, multiple households).

Next, the application of the magnesium secondary battery to a power tool will be described. FIG. 8C illustrates a block diagram illustrating the configuration of a power tool. The power tool is, for example, an electric drill, and includes a control unit 4001 and a power source 4002 inside a tool main body 4000 produced using a plastic material and the like. For example, a drill unit 4003, which is a moving unit, is attached to the tool main body 4000 so as to rotate. The control unit 4001 is a unit that controls the operation of the entire power tool (including a used state of the power source 4002), and includes, for example, a CPU and the like. The power source 4002 can include one or two or more magnesium secondary batteries according to an embodiment (not illustrated). The control unit 4001 supplies electric power from the power source 4002 to the drill unit 4003 in response to the operation of an operation switch (not illustrated).

One or more embodiments of the present application have been described herein, but they merely exemplify typical examples, and the present application is not limited thereto, and various modifications thereof can be considered.

For example, the composition of the electrolytic solution, the raw materials used for the manufacturing, the manufacturing method, the manufacturing conditions, the characteristics of the electrolytic solution, and the configuration and the structure of the electrochemical device or the battery that have been described above are examples, are not limited to the examples, and can be appropriately changed. The electrolytic solution according to an embodiment can also be mixed with an organic polymer (for example, polyethylene oxide, polyacrylonitrile and/or polyvinylidene fluoride (PVdF)) and used as a gel electrolyte.

EXAMPLES

Hereinafter, the present application will be described more specifically with reference to Examples according to an embodiment; however, the present application is not limited to these Examples. In order to confirm the effect of the present application, the following demonstration test was carried out.

[Electrochemical Characteristic Evaluation by CV Measurement of Electrolytic Solution]

Example 1

An electrolytic solution having the following specifications was prepared.

(Specifications of Electrolytic Solution)

First magnesium salt: Magnesium bis(hexamethyldisilazide) ($Mg(HMDS)_2$), manufactured by Sigma-Aldrich Co. LLC.

Second magnesium salt: Magnesium bis(trifluoromethanesulfonyl)imide $Mg(TFSI)_2$): manufactured by Tomiyama Pure Chemical Industries, Ltd.

Solvent (linear ether solvent): Diethylene glycol dimethyl ether (G2): manufactured by Tomiyama Pure Chemical Industries, Ltd.

$Mg(HMDS)_2$ as the first magnesium salt and $Mg(TFSI)_2$ as the second magnesium salt each were added to diethylene glycol dimethyl ether so as to be 0.3 M, and the mixture was stirred at 120° C. overnight. As a result, an electrolytic solution (molar ratio ($N_{second\ Mg\ salt}/N_{first\ Mg\ salt}$)=1) was prepared. The obtained electrolytic solution was an electrolytic solution intentionally containing no halogen and substantially containing no halogen (that is, a halogen-free electrolytic solution).

In order to evaluate the electrochemical characteristics of the electrolytic solution, triple-pole cyclic voltammetry (CV) measurement was performed on the electrolytic solution under the following conditions.

(Measurement Conditions)

Working electrode: Platinum (Pt) electrode (φ1.6 mm)

Reference electrode: Mg rod (φ1.6 mm)

Counter electrode: Mg rod (φ1.6 mm)

Sweep speed: 25 mV/s

Measurement temperature: 25° C.

Comparative Example 1

An electrolytic solution was prepared in the same manner as in Example 1, except that the concentration of $Mg(HMDS)_2$ was changed from 0.3 M to 0 M and the concentration of $Mg(TFSI)_2$ was changed from 0.3 M to 0.6 M. The obtained electrolytic solution of Comparative Example 1 was an electrolytic solution in which only $Mg(TFSI)_2$ was dissolved. The CV measurement was performed on the electrolytic solution of Comparative Example 1 in the same manner as in Example 1.

Comparative Example 2

An electrolytic solution was prepared in the same manner as in Example 1, except that $Mg(HMDS)_2$ was changed to magnesium perchlorate ($Mg(ClO_4)_2$, manufactured by Sigma-Aldrich Co. LLC). The obtained electrolytic solution of Comparative Example 2 was an electrolytic solution in which $Mg(TFSI)_2$ and $Mg(ClO_4)_2$ were dissolved. The CV measurement was performed on the electrolytic solution of Comparative Example 2 in the same manner as in Example 1.

(Results)

Figure 10:
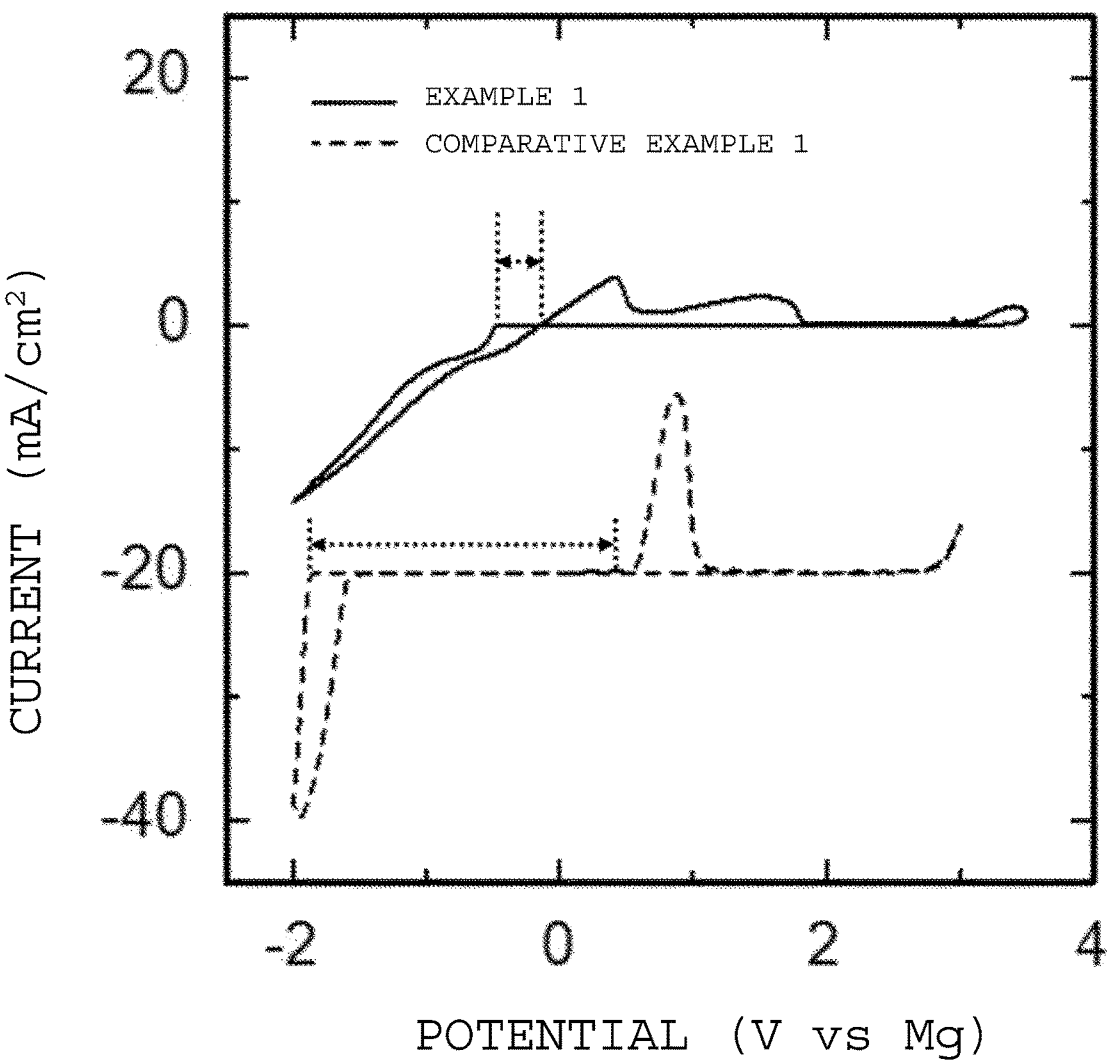
FIG. 10 shows results of "cyclic voltammetry evaluation" in EXAMPLES of the present specification (Example 1 and Comparative Example 1).

FIG. 10 shows a CV curve of each electrolytic solution (in FIG. 10, solid line: Example 1, broken line: Comparative Example 1). In the CV curve of the electrolytic solution of Comparative Example 1 (the electrolytic solution in which only $Mg(TFSI)_2$ is dissolved), the voltage difference between the dissolution and precipitation of Mg (that is, overvoltage at the time of Mg dissolution and precipitation) was about 2 V (indicated by a dotted double-headed arrow in FIG. 10). It was confirmed that this overvoltage was about 2 V or more regardless of the concentration of $Mg(TFSI)_2$. Also in the CV curve (not shown) of Comparative Example 2, the overvoltage was about 2 V or more as in Comparative Example 1. On the other hand, in the CV curve of the electrolytic solution of Example 1 (the electrolytic solution in which $Mg(HMDS)_2$ was dissolved), the overvoltage was 0.5 V or less (indicated by a dotted double-headed arrow in FIG. 10).

From the above results, it was shown that the overvoltage was reduced more in the electrolytic solution containing $Mg(HMDS)_2$ as an electrolyte of Example 1 than in the electrolytic solutions not containing $Mg(HMDS)_2$ as an electrolyte of Comparative Examples 1 and 2. It was shown that the overvoltage was reduced more in the halogen-free electrolytic solution of Example 1 than the electrolytic solution containing halogen of Comparative Example 2. From this point, it became clear that the reduction of overvoltage is a specific effect caused by $Mg(HMDS)_2$ contained in the electrolytic solution.

[Electrochemical Characteristic Evaluation by Charging and Discharging of Secondary Battery]

Example 3

As an electrochemical device, a magnesium-sulfur secondary battery having the following specifications was produced.

(Specifications of Magnesium-Sulfur Secondary Battery)

Figure 9:
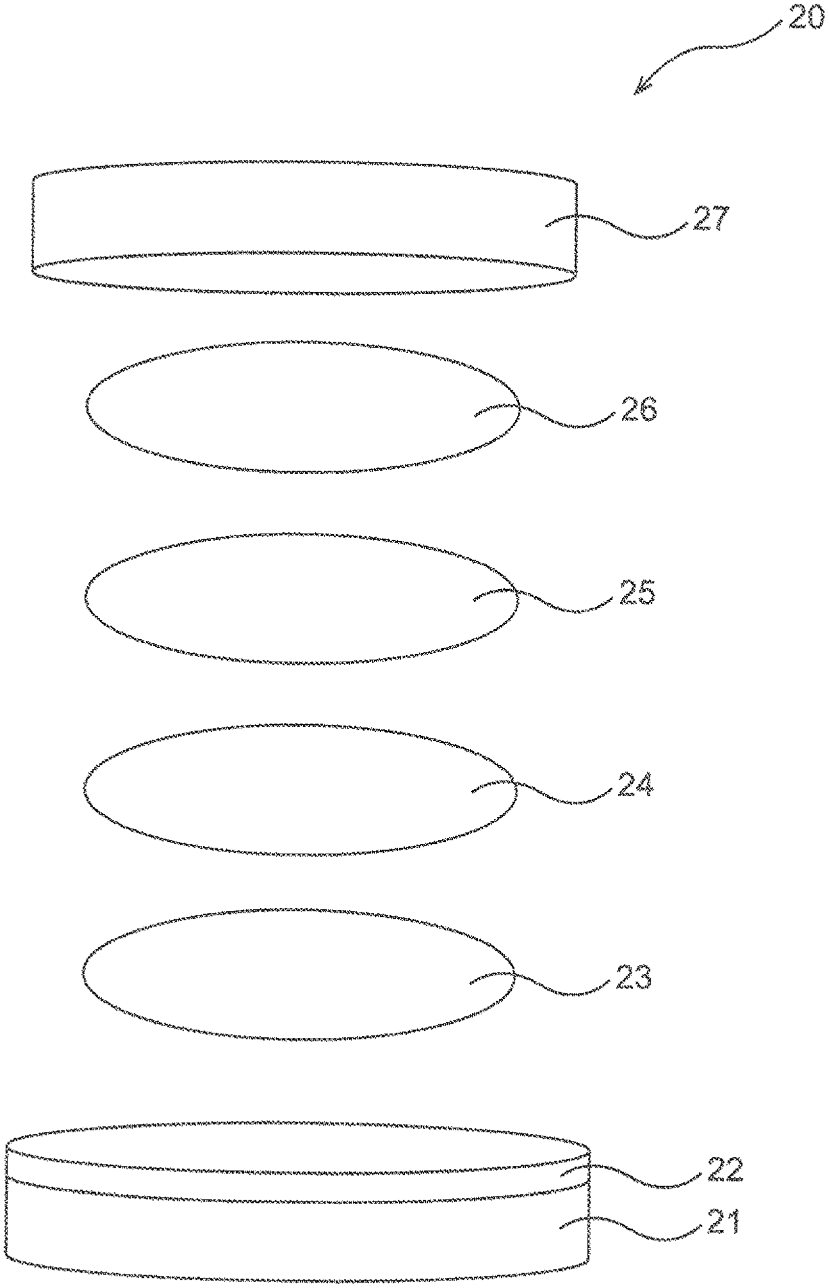
FIG. 9 is a developed view schematically illustrating a battery produced in EXAMPLES of the present description.

- Electrolytic solution: Electrolytic solution of Example 1 (halogen-free electrolytic solution containing a first magnesium salt, a second magnesium salt, and a solvent)
- Negative electrode: electrode containing magnesium (Mg plate with φ16 mm (Mg plate having a thickness of 200 μm/purity: 99.9%)
- Positive electrode: Sulfur electrode (electrode containing $S_8$ sulfur, containing Ketjen black (KB) as a conductive auxiliary agent, containing PTFE as a binder, and containing SUS foil (φ15 mm) as a current collecting mesh) Separator: glass fiber (glass fiber manufactured by ADVANTEC)
- Secondary battery form: Coin battery CR2016 type FIG. 9 illustrates a schematic developed view of a produced battery. Regarding a positive electrode 23, 10% by mass of sulfur ($S_8$), 60% by mass of Ketjen black as a conductive auxiliary agent, and 30% by mass of polytetrafluoroethylene (PTFE) as a binder were mixed using an agate mortar. Then, the mixture was rolled about 10 times using a roller compactor while being softened with acetone. Thereafter, the resultant was dried by vacuum drying at 70° C. for 12 hours to obtain a positive electrode mixture sheet. The obtained positive electrode mixture sheet was punched into a circular shape to obtain the positive electrode 23 (diameter: 15 mm). A current collecting mesh SUS foil was used and was used with attachment to the positive electrode.

A gasket 22 was placed on a coin battery can 21, on which the positive electrode 23 including sulfur, a glass fiber separator 24, a negative electrode 25 including a 200-μm-thick Mg plate having a diameter of 15 mm, a spacer 26 including a 0.5-mm-thick stainless-steel plate, and a coin battery lid 27 were stacked in this order and then sealed inside by crimping the coin battery can 21. The spacer 26 was spot-welded to the coin battery lid 27 in advance. The electrolytic solution was used in the form of being contained in the separator 24 of the coin battery 20.

The produced battery was subjected to charge and discharge. The (initial) discharge conditions are as follows.

(Charge and Discharge Conditions)

Discharge conditions: CC discharge 0.1 mA/0 to 2.2 V cutoff

Comparative Example 3

A magnesium-sulfur secondary battery was produced in the same manner as in Example 3, except that the electrolytic solution of Example 1 was changed to the electrolytic solution of Comparative Example 1, and the magnesium-sulfur secondary battery was charged and discharged in the same manner as in Example 1.

(Results)

Figure 11:
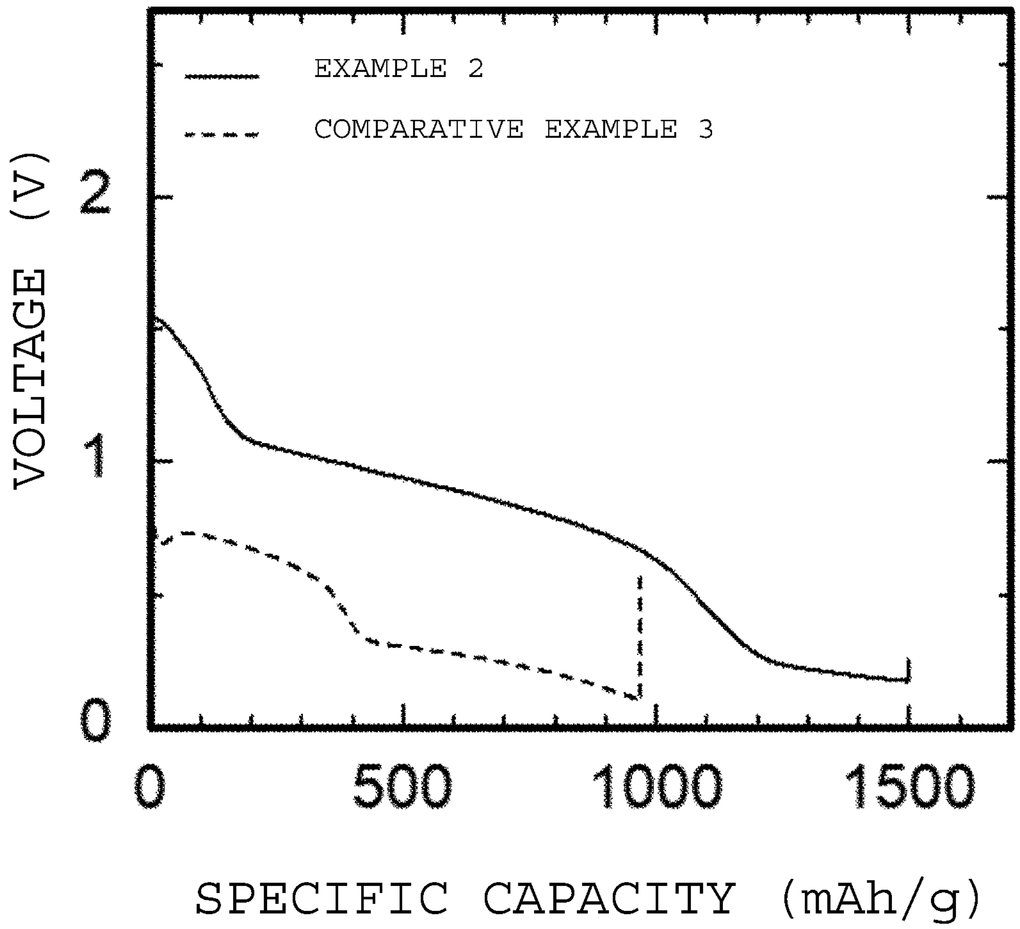
FIG. 11 shows results of a discharge curve obtained in EXAMPLES of the present description (Example 2 and Comparative Example 3).

FIG. 11 shows an initial discharge voltage of each magnesium-sulfur secondary battery (in FIG. 11, solid line: Example 2, broken line: Comparative Example 3). The discharge voltage of the secondary battery of Comparative Example 3 (the secondary battery using the electrolytic solution in which only $Mg(TFSI)_2$ was dissolved) showed two plateaus, and was about 0.7 V and 0.3 V, respectively. On the other hand, the discharge voltage of the secondary battery of Example 2 (the secondary battery using the electrolytic solution in which $Mg(HMDS)_2$ was dissolved) was about 1 V.

From the above results, it became clear that the secondary battery of Example 2 (the secondary battery including the halogen-free electrolytic solution containing $Mg(HMDS)_2$) showed a higher discharge voltage and improved energy density than the secondary battery of Comparative Example 3 (the secondary battery including the electrolytic solution not containing $Mg(HMDS)_2$).

Summarizing the above, the following items were enabled be found from this verification test.

- When the electrolytic solution contains a "first magnesium salt having a disilazide structure represented by general formula $(R_3Si)_2N$" and is halogen-free, the overvoltage is reduced and the energy density of a magnesium battery including such an electrolytic solution is improved.
- Since the "disilazide" first magnesium salt had a lower alkyl group having 1 or more and 4 or less carbon atoms (more specifically, a methyl group), such a feature can contribute to the reduction of overvoltage. Such a feature can contribute to the improvement in energy density of a magnesium battery including an electrolytic solution containing such a first magnesium salt.
- Since the electrolytic solution further contains a "second magnesium salt represented by general formula $MgN(C_mF_{2m+1}SO_2)_2$", such a feature can contribute to the reduction of overvoltage. Such a feature can contribute to the improvement in energy density of a magnesium battery including such an electrolytic solution.

Since the second magnesium salt has a perfluoroalkyl group in which m is an integer of 1 or more and 4 or less (more specifically, 1), such a feature can contribute to the reduction of overvoltage. Such a feature can contribute to the improvement in energy density of a magnesium battery including an electrolytic solution containing such a second magnesium salt.

Since the electrolytic solution contains a linear ether represented by General Formula (3) as a solvent, such a feature can contribute to the reduction of overvoltage. Such a feature can contribute to the improvement in energy density of a magnesium battery including such an electrolytic solution.

Since the linear ether represented by General Formula (3) has an ethylene oxide structure in which n is an integer of 1 or more and 10 or less, such a feature can contribute to the reduction of overvoltage. Such a feature can contribute to the improvement in energy density of a magnesium battery including an electrolytic solution containing such a linear ether.

The electrolytic solution of the present application can be used in various fields for extracting energy by utilizing an electrochemical reaction. Although it is merely an example, the electrolytic solution of the present application is used not only for secondary batteries but also for various electrochemical devices such as capacitors, air batteries and fuel cells.

DESCRIPTION OF REFERENCE SYMBOLS

10: Positive electrode
11: Negative electrode
12: Electrolyte layer
31: Positive electrode
32: Negative electrode
33: Separator
35, 36: Current collector
37: Gasket
41: Porous positive electrode
42: Negative electrode
43: Separator and electrolytic solution
44: Air electrode-side current collector
45: Negative electrode-side current collector
46: Diffusion layer
47: Oxygen-selective permeable membrane
48: Exterior body
51: Air (atmosphere)
52: Oxygen
61: Positive electrode
62: Positive electrode electrolytic solution
63: Positive electrode electrolytic solution transport pump
64: Fuel flow path
65: Positive electrode electrolytic solution storage container
71: Negative electrode
72: Negative electrode electrolytic solution
73: Negative electrode electrolytic solution transport pump
74: Fuel flow path
75: Negative electrode electrolytic solution storage container
66: Ion exchange membrane
100: Magnesium secondary battery
111: Electrode structure housing member (battery can)
112, 113: Insulating plate
114: Battery lid
115: Safety valve mechanism
115A: Disk plate
116: Positive temperature coefficient element (PTC element)
117: Gasket
118: Center pin
121: Electrode structure
122: Positive electrode
123: Positive electrode lead portion
124: Negative electrode
125: Negative electrode lead portion
126: Separator
200: Exterior member
201: Adhesive film
221: Electrode structure
223: Positive electrode lead portion
225: Negative electrode lead portion
1001: Cell (assembled battery)
1002: Magnesium secondary battery
1010: Control unit
1011: Memory
1012 Voltage measuring unit
1013: Current measuring unit
1014: Current detection resistor
1015: Temperature measuring unit
1016: Temperature detection element
1020: Switch control unit
1021: Switch unit
1022: Charge control switch
1024: Discharge control switch
1023, 1025: Diode
1031: Positive electrode terminal
1032: Negative electrode terminal
CO, DO: Control signal
2000: Housing
2001: Control unit
2002: Various sensors
2003: Power source
2010: Engine
2011: Power generator
2012, 2013: Inverter
2014: Driving motor
2015: Differential device
2016: Transmission
2017: Clutch
2021: Front wheel drive shaft
2022: Front wheel
2023: Rear wheel drive shaft
2024: Rear wheel
3000: House
3001: Control unit
3002: Power source
3003: Smart meter
3004: Power hub
3010: Electrical device (electronic device)
3011: Electrically driven vehicle
3021: Private power generator
3022: Centralized electric power system
4000: Tool main body
4001: Control unit
4002: Power source
4003: Drill unit It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. An electrolytic solution for an electrochemical device including a magnesium electrode as a negative electrode and a positive electrode, the electrolytic solution comprising:

a solvent and a magnesium salt including a first magnesium salt and a second magnesium salt;

the first magnesium salt having a disilazide structure represented by General Formula (1):

$$(R_3Si)_2N \quad (1)$$

wherein R is an aliphatic hydrocarbon group having 1 or more and 10 or less carbon atoms, and each R may be the same as or different from each other; and the second magnesium salt represented by General Formula (2):

$$MgN(C_mF_{2m+1}SO_2)_2 \quad (2)$$

wherein m is an integer of 1 or more and 10 or less, wherein a molar ratio of the second magnesium salt to the first magnesium salt is from 0.5 to 2.0, wherein the electrolytic solution includes a trace amount of a halogen content corresponding to a halogen form including one or both of a halide ion and a halide salt, and wherein the trace amount of the halogen content is 100 ppm or less.

2. The electrolytic solution according to claim 1, wherein in General Formula (1) above, R is a lower alkyl group having 1 or more and 4 or less carbon atoms.

3. The electrolytic solution according to claim 1, wherein in General Formula (1) above, R is a methyl group.

4. The electrolytic solution according to claim 1, wherein in General Formula (2) above, m is an integer of 1 or more and 4 or less.

5. The electrolytic solution according to claim 1, wherein in General Formula (2) above, m is 1.

6. The electrolytic solution according to claim 1, wherein the solvent is a linear ether represented by General Formula (3):

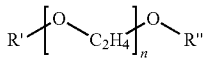

(3)

wherein R' and R" are each independently a hydrocarbon group having 1 or more and 10 or less carbon atoms, and may be the same as or different from each other, and n is an integer of 1 or more and 10 or less.

7. The electrolytic solution according to claim 1, wherein in General Formula (3) above, R' and R" are each independently a lower alkyl group having 1 or more and 4 or less carbon atoms, and n is an integer of 1 or more and 4 or less.

8. The electrolytic solution according to claim 1, wherein in General Formula (3) above, R' and R" are a methyl group, and n is 2.

9. The electrolytic solution according to claim 1, wherein the positive electrode is a sulfur electrode containing sulfur.

10. The electrolytic solution according to claim 1, wherein the molar ratio is 1.

11. The electrolytic solution according to claim 10, wherein the first magnesium salt is magnesium bis(hexamethyldisilazide) and the second magnesium salt is magnesium bis(trifluoromethylsulfonyl)imide.

12. The electrolytic solution according to claim 1, wherein the magnesium salt is the first magnesium salt and the second magnesium salt.

13. The electrolytic solution according to claim 1, wherein the magnesium salt further includes a third magnesium salt not including a halogen, and wherein the magnesium salt is the first magnesium salt, the second magnesium salt and the third magnesium salt.

14. The electrolytic solution according to claim 1, wherein the molar ratio of the second magnesium salt to the first magnesium salt is from 0.5 to 1.25.

15. An electrochemical device comprising a negative electrode and a positive electrode, the negative electrode being a magnesium electrode, and an electrolytic solution of the electrochemical device being the electrolytic solution according to claim 1.

16. The electrochemical device according to claim 15, wherein the positive electrode is a sulfur electrode containing sulfur.

* * * * *